(12) United States Patent
Swinford et al.

(10) Patent No.: US 10,989,827 B2
(45) Date of Patent: Apr. 27, 2021

(54) SEISMIC NODE DEPLOYMENT SYSTEM

(71) Applicant: ION Geophysical Corporation, Houston, TX (US)

(72) Inventors: John McCauley Swinford, Indianapolis, IN (US); Timothy A. Dudley, Houston, TX (US); Per Birger Nakken, Hjorungavag (NO); Fredrik Buch, Ulsteinvik (NO)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 16/571,886

(22) Filed: Sep. 16, 2019

(65) Prior Publication Data

US 2020/0025962 A1    Jan. 23, 2020

Related U.S. Application Data

(63) Continuation of application No. 15/987,241, filed on May 23, 2018.

(60) Provisional application No. 62/509,922, filed on May 23, 2017, provisional application No. 62/517,334, filed on Jun. 9, 2017.

(51) Int. Cl.
  *G01V 1/38* (2006.01)
  *B63B 21/66* (2006.01)

(52) U.S. Cl.
  CPC ............ *G01V 1/3852* (2013.01); *B63B 21/66* (2013.01); *G01V 1/3808* (2013.01); *G01V 1/3817* (2013.01); *G01V 1/3843* (2013.01)

(58) Field of Classification Search
  CPC .. G01V 1/3852; G01V 1/3808; G01V 1/3817; G01V 1/3843; B65B 21/66
  See application file for complete search history.

(56) References Cited

U.S. PATENT DOCUMENTS

| 2,824,183 A | 2/1958 | Marasco et al. |
| 2,981,454 A | 4/1961 | Dickinson et al. |
| 3,093,333 A | 6/1963 | Bishop |
| 4,055,138 A | 10/1977 | Klein |
| 4,281,403 A | 7/1981 | Siems et al. |
| 4,292,861 A | 10/1981 | Thornhill, Jr. et al. |

(Continued)

FOREIGN PATENT DOCUMENTS

| CA | 2554788 C | 4/2016 |
| CA | 2581193 C | 4/2016 |

(Continued)

OTHER PUBLICATIONS

International Search Report and Written Opinion dated Sep. 3, 2018 in connection with International Patent Application No. PCT/US2018/034104, 12 pages.

(Continued)

*Primary Examiner* — Krystine E Breier
(74) *Attorney, Agent, or Firm* — Patterson + Sheridan, LLP

(57) ABSTRACT

A seismic node deployment system comprises a cable supply with one or more seismic nodes configured for coupling to the cable at one or more attachment locations for deployment to a water column. A node attachment system is configured to drive a portion of the cable into periodic or reciprocal motion so that the attachment speed is substantially reduced relative to the speed at which the cable is deployed.

25 Claims, 15 Drawing Sheets

(56) References Cited

U.S. PATENT DOCUMENTS

| | | | |
|---|---|---|---|
| 4,570,245 A | 2/1986 | Thigpen | |
| 4,646,006 A | 2/1987 | Schweitzer, Jr. et al. | |
| 4,666,338 A | 5/1987 | Schoepf | |
| 4,692,906 A | 9/1987 | Neeley | |
| 4,780,863 A | 10/1988 | Schoepf | |
| 5,189,642 A | 2/1993 | Donoho et al. | |
| 5,214,614 A | 5/1993 | Baule | |
| 5,214,768 A | 5/1993 | Martin et al. | |
| 5,253,223 A | 10/1993 | Svenning et al. | |
| 5,301,346 A | 4/1994 | Notarianni et al. | |
| 5,724,241 A | 3/1998 | Wood et al. | |
| 5,937,782 A | 8/1999 | Rau | |
| 6,024,344 A | 2/2000 | Buckley et al. | |
| 6,070,470 A | 6/2000 | Harms et al. | |
| 6,070,857 A | 6/2000 | Dragsund et al. | |
| 6,082,710 A | 7/2000 | Dragsund et al. | |
| 6,418,872 B1 | 7/2002 | Cour | |
| 6,474,254 B1 | 11/2002 | Ambs et al. | |
| 6,607,050 B2 | 8/2003 | He et al. | |
| 6,657,921 B1 | 12/2003 | Ambs | |
| 6,932,185 B2 | 8/2005 | Bary et al. | |
| 6,934,219 B2 | 8/2005 | Burkholder et al. | |
| 6,951,138 B1 | 10/2005 | Jones | |
| 6,977,867 B2 | 12/2005 | Chamberlain | |
| 7,104,728 B2 | 9/2006 | Luc et al. | |
| 7,124,028 B2 | 10/2006 | Ray et al. | |
| 7,254,093 B2 | 8/2007 | Ray et al. | |
| 7,286,442 B2 | 10/2007 | Ray et al. | |
| 7,310,287 B2 | 12/2007 | Ray et al. | |
| 7,561,493 B2 | 7/2009 | Ray et al. | |
| 7,602,667 B2 | 10/2009 | Thompson | |
| 7,646,670 B2 | 1/2010 | Maxwell et al. | |
| 7,649,803 B2 | 1/2010 | Ray et al. | |
| 7,656,746 B2 | 2/2010 | De et al. | |
| 7,660,193 B2 | 2/2010 | Goujon et al. | |
| 7,668,047 B2 | 2/2010 | Ray et al. | |
| 7,804,737 B2 | 9/2010 | Thompson | |
| 7,724,607 B2 | 10/2010 | Ray et al. | |
| 7,883,292 B2 * | 2/2011 | Thompson | G01V 1/3852 405/166 |
| 7,983,847 B2 | 7/2011 | Ray et al. | |
| 7,986,589 B2 | 7/2011 | Ray et al. | |
| 7,990,803 B2 | 8/2011 | Ray et al. | |
| 8,050,140 B2 | 11/2011 | Ray et al. | |
| 8,087,848 B2 * | 1/2012 | Thompson | B63B 21/66 405/166 |
| 8,172,480 B2 | 5/2012 | Thompson et al. | |
| 8,228,761 B2 | 7/2012 | Ray et al. | |
| 8,296,068 B2 | 10/2012 | Ray et al. | |
| 8,328,467 B2 | 12/2012 | Thompson et al. | |
| 8,644,111 B2 | 2/2014 | Ray et al. | |
| 8,801,328 B2 | 8/2014 | Thomspon et al. | |
| 8,879,362 B2 | 11/2014 | Ray et al. | |
| RE45,268 E | 12/2014 | Ray et al. | |
| 9,448,311 B2 | 9/2016 | Maxwell | |
| 9,475,552 B2 | 10/2016 | Thompson et al. | |
| 9,523,780 B2 | 12/2016 | Naes et al. | |
| 9,829,589 B2 | 11/2017 | Ray et al. | |
| 9,829,594 B2 | 11/2017 | Ray et al. | |
| 2005/0105391 A1 | 5/2005 | Berg | |
| 2005/0246137 A1 | 11/2005 | Brinkman et al. | |
| 2006/0201243 A1 | 9/2006 | Auffret et al. | |
| 2007/0044970 A1 | 3/2007 | Streater et al. | |
| 2008/0106977 A1 | 5/2008 | Ray et al. | |
| 2008/0181055 A1 | 7/2008 | Ray et al. | |
| 2009/0016157 A1 | 1/2009 | Ray et al. | |
| 2009/0092005 A1 | 4/2009 | Goujon et al. | |
| 2010/0054078 A1 | 3/2010 | Thompson et al. | |
| 2013/0058192 A1 | 3/2013 | Gateman et al. | |
| 2015/0362606 A1 | 12/2015 | Henman et al. | |
| 2017/0082763 A1 | 3/2017 | Rokkan et al. | |
| 2017/0254913 A1 | 9/2017 | Ray et al. | |
| 2017/0261627 A1 | 9/2017 | Ray et al. | |
| 2017/0261628 A1 | 9/2017 | Ray et al. | |
| 2018/0341033 A1 | 11/2018 | Olivier et al. | |
| 2018/0341035 A1 * | 11/2018 | Swinford | G01V 1/3852 |
| 2019/0018159 A1 * | 1/2019 | Parker | B66D 1/525 |
| 2019/0377097 A1 | 12/2019 | Dudley et al. | |

FOREIGN PATENT DOCUMENTS

| | | |
|---|---|---|
| CN | 101825721 B | 2/2012 |
| CN | 101057160 B | 9/2012 |
| CN | 106249280 A | 12/2016 |
| EA | 2559 B1 | 6/2002 |
| EP | 1716435 A2 | 11/2006 |
| EP | 1805533 A1 | 7/2007 |
| GB | 2275337 A | 8/1994 |
| GB | 2395273 A | 5/2004 |
| MX | PA06008582 A | 8/2007 |
| MX | 2007003290 A | 10/2008 |
| RU | 2352960 C2 | 4/2009 |
| RU | 2416810 C2 | 4/2011 |
| RU | 2427859 C1 | 8/2011 |
| WO | 2000041926 A1 | 7/2000 |
| WO | 03096072 A1 | 11/2003 |
| WO | 2004031807 A1 | 4/2004 |
| WO | 2004046682 A2 | 6/2004 |
| WO | 2005074426 A2 | 8/2005 |
| WO | 2005119299 A1 | 12/2005 |
| WO | 2006041438 A1 | 4/2006 |
| WO | 2010025283 A2 | 3/2010 |
| WO | 2011139159 A1 | 11/2011 |
| WO | 2013109672 A1 | 7/2013 |
| WO | 2017007879 A1 | 1/2017 |
| WO | 2019237127 A2 | 12/2019 |

OTHER PUBLICATIONS

Authenticating Declaration of Ruben J. Rodrigues dated Aug. 10, 2018 in connection with IPR2018-00962, 4 pages.
U.S. Appl. No. 10/448,547.
International Search Report and Written Opinion dated Oct. 29, 2018 in connection with International Patent Application No. PCT/US2018/034406, 18 pages.
Invitation to pay additional fees and partial search report issued for International Application No. PCT/US2019/036424 dated Oct. 9, 2019, 16 pages.
Invitation to Pay Additional Fees, and, Where Applicable, Protest Fee dated Sep. 6, 2018 in connection with International Patent Application No. PCT/US2018/034406, 12 pages.
Magseis FF LLC's Patent Owner Response Pursuant to 37 C.F.R. § 42.120(a) dated Feb. 8, 2019 in connection with IPR2018-00962, 74 pages.
Patent Owner Preliminary Response filed Aug. 10, 2018 in connection with IPR2018-00962, 71 pages.
Photograph of the ZXPLR node, 1 page, in connection with IPR2018-00961.
Photograph of Z3000 node in connection with IPR2018-00961, 1 page.
Results from Google Scholar search on Schmalfeldt, 2 pages.
Transcript of Jun. 4, 2019 deposition of Gerard Beaudoin in connection with IPR2018-00960, IPR2018-00961, and IPR2018-00962, 30 pages.
Z3000 Chart filed as exhibit 2048 in IPR2018-00962, 28 pages.
Z3000 Chart in connection with IPR2018-00961, 29 pages.
Z700 Chart filed as exhibit 2049 in connection with IPR2018-00962, 27 pages.
Z700 Chart, exhibit 2033 in IPR2018-00961, 29 pages.
Z700 Chart, exhibit 2033 in IPR2018-00962, 27 pages.
ZXPLR Chart, Exhibit 2034 in IPR2018-00961, 30 pages.
ZXPLR specification sheet, 2018, 1 page.
Makris, J. et al. "WARRP (Wide Aperture Reflection and Refraction Profiling): The principle of successful data acquisition where conventional seismic fails." SEG Technical Program Expanded Abstracts, Jan. 1999, 5 pages.
"WARRP Offfshore," GeoPro GmbH, Hamburg, Germany, 2002, 2 pages.

(56) References Cited

OTHER PUBLICATIONS

Sheriff, "Encyclopedic Dictionary of Applied Geophysics," Fourth Edition, 13 Geophysical References Series. 2002, 3 pages.
Shao, A. et al. "An ocean bottom seismic data recorder." Chinese Journal of Physics, vol. 46, No. 2, 2003, pp. 311-317.
Forland, W. "Posisjonsbestemmelse VED avbunnsseismikk (10m-2000m)", Geodesi—OG Hydrografidagene 2004, Multiwave Geophysical Company ASA, 25 pages.
"A Seismic Shift in OBN Efficiency," Manta, Seabed Geosolutions, revised Dec. 2016, 1 page.
Deposition Transcripts of Gerard Beaudoin dated Jan. 21, 2019 in connection with IPR2018-00960, IPR2018-00961, and IPR2018-00962, 147 pages.
Declaration of Carol Elizabeth Jacobson regarding public availability of defense technical information center records dated Nov. 1, 2018, 3 pages.
Transcripts of Apr. 12, 2019 deposition of Rocco Detomo in connection with IPR2018-00960, IPR2018-00961, and IPR2018-00962, 25 pages.
Institution of Inter Partes Review Decision entered Nov. 29, 2018 in IPR2018-00960, 30 pages.
Inter Partes Review Decision entered Nov. 8, 2018 in IPR2018-00961, 53 pages.
Inter Partes Review Decision entered Nov. 8, 2018 in IPR2018-00962, 39 pages.
Fairfield Industries Wins 2006 Helios "Partnership" Award, Business Wire, Dec. 18, 2006, 1 page.
First Amended Complaint filed Dec. 18, 2017 in connection with Inter Partes Review Case No. 4:17-cv-01458, 105 pages.
Feb. 17, 1984 Government Reports Announcements & Index (Michigan State University Libraries), 150 pages.
Government Reports, Announcements & Index, U.S. Department of Commerce National Technical Information Service, vol. 84, No. 4, Feb. 17, 1984, 11 pages.
Patent Owner Response dated Feb. 19, 2019 in connection with IPR2018-00960, 74 pages.
Declaration of Laurie Stewart dated Feb. 5, 2019 in connection with IPR2018-00961, 6 pages.
Declaration of Laurie Stewart dated Feb. 5, 2019 in connection with IPR2018-00962, 6 pages.
Declaration of Dr. Rocco Detomo dated Feb. 6, 2019 in connection with IPR2018-00960, 86 pages.
Declaration of Dr. Rocco Detomo dated Feb. 6, 2019 in connection with IPR2018-00961, 104 pages.
Declaration of Dr. Rocco Detomo dated Feb. 6, 2019 in connection with IPR2018-00962, 93 pages.
Declaration of Michael Morris dated Feb. 6, 2019 in connection with IPR2018-00961, 3 pages.
Declaration of Michael Morris dated Feb. 6, 2019 in connection with IPR2018-00962.
Authenticating Declaration of Sarah E. Rieger dated Feb. 8, 2019 in connection with IPR2018-00961, 3 pages.
Magseis FF LLC's Patent Owner Response Pursuant to 37 C.F.R. § 42.120(a) dated Feb. 8, 2019 in connection with IPR2018-00961, 80 pages.
Memorandum and Order dated Mar. 10, 2015 in connection with Civil Action No. 4:14-CV-2972, 37 pages.
Transcriptions of Apr. 11, 2019 Deposition of Dr. Rocco Detomo in connection with IPR2018-00960, IPR2018-00961, and IPR2018-0062, 71 pages.
Transcript of Apr. 15, 2019 Deposition of Laurie A. Stewart in connection with IPR2018-00961, IPR2018-00961, and IPR2018-00962, 18 pages.
Openshaw, "The Atlantis OBS Project: Managing the OBS Node Development Evolution," Offshore Technology Conference, May 1, 2006. 10 pages.
"A Seismic Shift in OBN Efficiency," Manta, Seabed Geosolutions, revised May 2017, 1 page.

Motion to Stay Pending Inter Partes Reviews of the Patents-In-Suit filed May 1, 2018 in Inter Partes Review Case No. 4:17-cv-01458, 15 pages.
Complaint filed May 11, 2017 in connection with Inter Partes Review Case No. 17-cv-01458, 27 pages.
Petitioner's Reply to Patent Owner's Response dated May 8, 2019 in connection with IPR2018-00960, 34 pages.
Petitioner's Reply to Patent Owner's Response dated May 8, 2019 in connection with IPR2018-00961, 35 pages.
Petitioner's Reply to Patent Owner's Response dated May 8, 2019 in connection with IPR2018-00962, 35 pages.
Supplemental Declaration of Gerard J. Beaudoin dated May 8, 2019 in connection with IPR2018-00960, 7 pages.
Supplemental Declaration of Gerard J. Beaudoin dated May 8, 2019 in connection with IPR2018-00961, 11 pages.
Supplemental Declaration of Gerard J. Beaudoin dated May 8, 2019 in connection with IPR2018-00962, 11 pages.
Magseis FF LLC's Sur-Reply to Petitioner's Reply to Patent Owner's Response dated Jun. 10, 2019 in connection with IPR2018-00960, 29 pages.
Magseis FF LLC's Sur-Reply to Petitioner's Reply to Patent Owner's Response dated Jun. 10, 2019 in connection with IPR2018-00961, 36 pages.
Magseis FF LLC's Sur-Reply to Petitioner's Reply to Patent Owner's Response dated Jun. 10, 2019 in connection with IPR2018-00962, 34 pages.
Schmalfeldt, et al. "Explosion-Generated Seismic Interface Waves in Shallow Water: Experimental Results." Saclantcen Report SR-71, Jul. 1, 1983. 40 pages.
2010 Specification Sheet for the Z3000 node, in connection with IPR2018-00961, Aug. 2010, 1 page.
Authenticating Declaration of Ruben J. Rodrigues dated Aug. 10, 2018 in connection with IPR2018-00961, 4 pages.
Patent Owner Preliminary Response filed Aug. 10, 2018 in connection with IPR2018-00961, 75 pages.
"Seismic Acquisition," Schlumberger Oilfield Glossary, obtained Sep. 2, 2014 from <http://www.glossary.oilfield.slb.com/enTerms/s/seismic_acquisition.aspx.>, 1 page.
Memorandum and Order dated Sep. 25, 2018 in Civil Action No. H-17-1458, 9 pages.
Z700 node specification sheet, Sep. 9, 2009, 1 page.
Beaudoin et al. "Field design and operation of a novel deepwater, wide-azimuth node seismic survey." The Leading Edge, Apr. 2007, 8 pages.
Bommer et al. "Control of Hazard Due to Seismicity Induced by a Hot Fractured Rock Geothermal Project," Engineering Geology, vol. 83, No. 4, 2006, 31 pages.
Buttgenbach et al. "Self-landing and ascending OBS: opportunity for commercial seismics in the ultra deep sea." First Break, vol. 20, Dec. 12, 2002, 12 pages.
Carstens, "Grabbing a Larger Share of the Market," Geo ExPro, vol. 7, No. 6, Dec. 2010, 6 pages.
Dellinger et al. "The "Green Canyon" event as recorded by the Atlantis OBS node survey." 4 pages.
Durham, "Nodal Seismic's Light Footprint a Big Plus," AAPG Explorer, Oct. 10, 2010, 3 pages.
Fisher, "Seismic Survey Probes Urban Earthquake Hazards in Pacific Northwest," EOS, vol. 80, No. 2, Jan. 12, 1999, 6 pages.
Grevemeyer et al. "Crustal architecture and deep structure of the Ninetyeast Ridge hotspot trail from active-source ocean bottom seismology." Geophys. J. Int., 2001, 144, 18 pages.
Hassan, et al. The Influence of Sediment Layering and Geoacoustics on the Propagation of Scholte Interface Waves, 1993, IEEE, I-105-I-113, 9 pages.
Hatchell et al. "Ocean Bottom Seismic (OBS) timing drift correction using passive seismic data." 2010, 5 pages.
Hino et al. "Micro-tsunami from a local interplate earthquake detected by cabled offshore tsunami observation in northeastern Japan," Geophysical Research Letters, vol. 28, No. 18, Sep. 15, 2001, 4 pages.
Hyne, Norman. "Nontechnical Guide to Petroleum Geology, Exploration, Drilling, and Production," 2nd Edition, 2011, 29 pages.

(56) References Cited

OTHER PUBLICATIONS

Hyne, "Dictionary of Petroleum Exploration, Drilling & Production: Definition of Seismic Exploration" Second Edition, 2014, 4 pages.

Hyne, "Dictionary of Petroleum Exploration, Drilling & Production: Definition of Seismic" Second Edition, 2014, 4 pages.

Klingelhofer et al. "Crustal structure of the NE Rockall Trough from wide-angle seismic data modeling." Journal of Geophysical Research, vol. 110, B11105, Nov. 29, 2005, 25 pages.

Marsella et al. "The Stromboli geophysical experiment. Preliminary report on wide angle refraction seismics and morphobathymetry of Stromboli island (southern Tyrrhenian Sea, Italy) based on integrated offshore-onshore data acquisition." 2007, 84 pgs.

Mienert, "Cruise Report Barents-Sea Continental Martin Hermes-Project 3D-Fluid Flow of HMMV," Jul. 17, 2005, 53 pages.

Moldoveanu, "Recent and future developments in marine acquisition technology; an unbiased opinion." Recorder, vol. 31, Mar. 2006.

Prevedel et al. "Downhole Geophysical Observatories: Best Installation Practices and a Case History from Turkey," Int. J. Earth Sci. Feb. 7, 2015, 11 pages.

Ross, Carl. "Pressure Vessels, External Pressure Technology." 2001, 16 pages.

Ross et al. "Field design and operation of a deep water, wide azimuth node seismic survey." SEG New Orleans 2006 Annual Meeting, 6 pages.

Schmalfeldt, et al. "Explosion-Generated Seismic Interface Waves in Shallow Water: Experimental Results," Saclant ASW Research Centre Report. Jul. 1, 1983, 67 pages.

Sheriff, "Encyclopedic Dictionary of Applied Geophysics," Fourth Edition, 13 Geophysical References Series. 2002, 5 pages.

Vuillermoz, et al. "Full Azimuth 4C Node Acquisition for Enhanced PP and PS imaging." 7th International Conference & Expo on Petroleum Geophysics, 2008.

International Search Report and Written Opinion issued for International Application No. PCT/US2019/036424 dated Dec. 3, 2019, 18 pages.

Search Report received for Russian Patent Application 2019132605 dated Feb. 10, 2020, 5 pages including 2 pages of English translation.

Danish Patent and Trademark Office, 1st technical examination of patent application PA 2019 70585, dated Aug. 13, 2020.

\* cited by examiner

SEISMIC NODE DEPLOYMENT SYSTEM

CROSS REFERENCE TO RELATED APPLICATIONS

This application is a continuation of U.S. patent application Ser. No. 15/987,241, which claims priority to U.S. Provisional Patent Application No. 62/509,922 filed 23 May 2017, "Seismic Node Deployment System," and to U.S. Provisional Patent Application No. 62/517,334, filed 9 Jun. 2017, entitled "Seismic Node Deployment System," each of which is incorporated by reference herein, in their entirety and for all purposes.

BACKGROUND

This disclosure relates generally to seismic data acquisition, including, but not limited to, seismic node deployment for marine seismic surveys. The disclosure also relates to a system or apparatus for attaching autonomous devices, such as acoustic positioning systems or seismic nodes or other sensor nodes, collectively referred to as nodes, to a rope or cable or wire, e.g., for deployment into a water column or other seismic medium.

Modern geophysical exploration techniques include both land-based and marine seismic surveys. In marine surveys, a seismic research vessel typically tows a source such as an airgun array, which periodically emits acoustic pulses generated by collapsing air bubbles. The acoustic waves propagate through the water column and penetrate the seabed or ocean floor, where they are reflected from boundaries between subsurface of geological formations. The reflected acoustic energy is detected by an array of seismic sensors or receivers, which generate seismic sensor data that can be processed to reconstruct the reflected wavefield and generate images of the corresponding subsurface geology.

Typically, the seismic receivers are distributed along a series of streamer lines towed behind the seismic vessel, or deployed directly onto the seabed along an ocean-bottom cable. Receivers can also be deployed as an array of individual, autonomous sensor nodes.

Within the water column, acoustic energy is substantially characterized by the propagation of pressure-type acoustic waves (P-waves). Thus, towed seismic streamer arrays traditionally utilize pressure-sensitive receivers such as hydrophones. The subsurface wavefield, on the other hand, includes both pressure waves and shear waves (S-waves), in addition to more complex wavefield contributions. Modern ocean-bottom seismic systems thus employ motion-sensitive devices such as geophones and accelerometers as well, for example in a sensor subarray with a combination of hydrophone and multi-axis geophone components, sensitive to both differential pressure and motion (velocity or acceleration) along three orthogonal axes.

In this more general approach, the pressure and shear wave contributions are combined to more accurately reproduce the full seismic wavefield, and to generate more complete images of the subsurface geology. Similar techniques can also be applied in land-based surveys, where both pressure and shear wave data are also available.

In order to accurately track and log the substantial quantities of seismic sensor data required to achieve these results, precision clock systems are typically provided, along with local data processing and storage components, a power supply, and an interface configured for control and data communications. As each of these components increase in data capacity, there is an ongoing need for improved seismic imaging techniques adapted to handle the correspondingly greater data flow.

The information included in this Background section of the specification, including any references cited herein and any description or discussion thereof, is included for technical reference purposes only and is not to be regarded subject matter by which the scope of the invention as defined in the claims is to be bound.

SUMMARY

This disclosure is directed to seismic data acquisition and seismic node deployment. System and method embodiments are encompassed, including, but not limited to, systems, methods and apparatus adapted for attaching seismic nodes, receivers, or other autonomous sensing devices, or, alternatively, acoustic pingers or other transponders for location identification or other information transmission (hereinafter referred to collectively as "nodes") to a rope or cable or wire, for deployment to a water column or other seismic medium. In this disclosure the term "cable" refers to rope, cable, or wire or other stress member to which nodes may be attached.

In various examples and embodiments, a suitable seismic node deployment system can comprise a cable supply configured to provide a cable, with one or more nodes configured for coupling to the cable for deployment to a water column. A node attachment system is configured to drive a portion of the cable into periodic motion between the cable supply and the water column, so that a speed of the cable is substantially reduced for attachment of the seismic nodes, relative to the speed at which the cable is payed out into the water and the seismic nodes are deployed. For the purpose of this disclosure, the terms "periodic" and "periodic motion" are not limited in meaning to regular, cyclical, or fixed intervals, but rather are to be broadly construed to also encompass merely recurrent or intermittent intervals that are variable and have no fixed or regular time frame between occurrences.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

In this disclosure, references may be made to various examples and embodiments of the invention. The scope of the claims is not limited to these particular examples, nor to any other specifically identified or enumerated embodiment, except as recited in the claim language. Any combination of the disclosed features may be adaptable to practice the invention, whether described in the context of single example or among the various embodiments, as defined within the metes and bounds of the claims.

Although some examples and embodiments may achieve various advantages over the prior art, and over other more contemporary solutions, these advantages do not limit the claim scope, except where explicitly recited. The aspects, features, and advantages of the disclosed examples and embodiments are merely illustrative, and references to particular features of the invention in the specification shall not be considered to generalize any of the claimed embodiments, except where those features are expressly included in the claim language.

Seismic Survey Deployment

Figure 1:
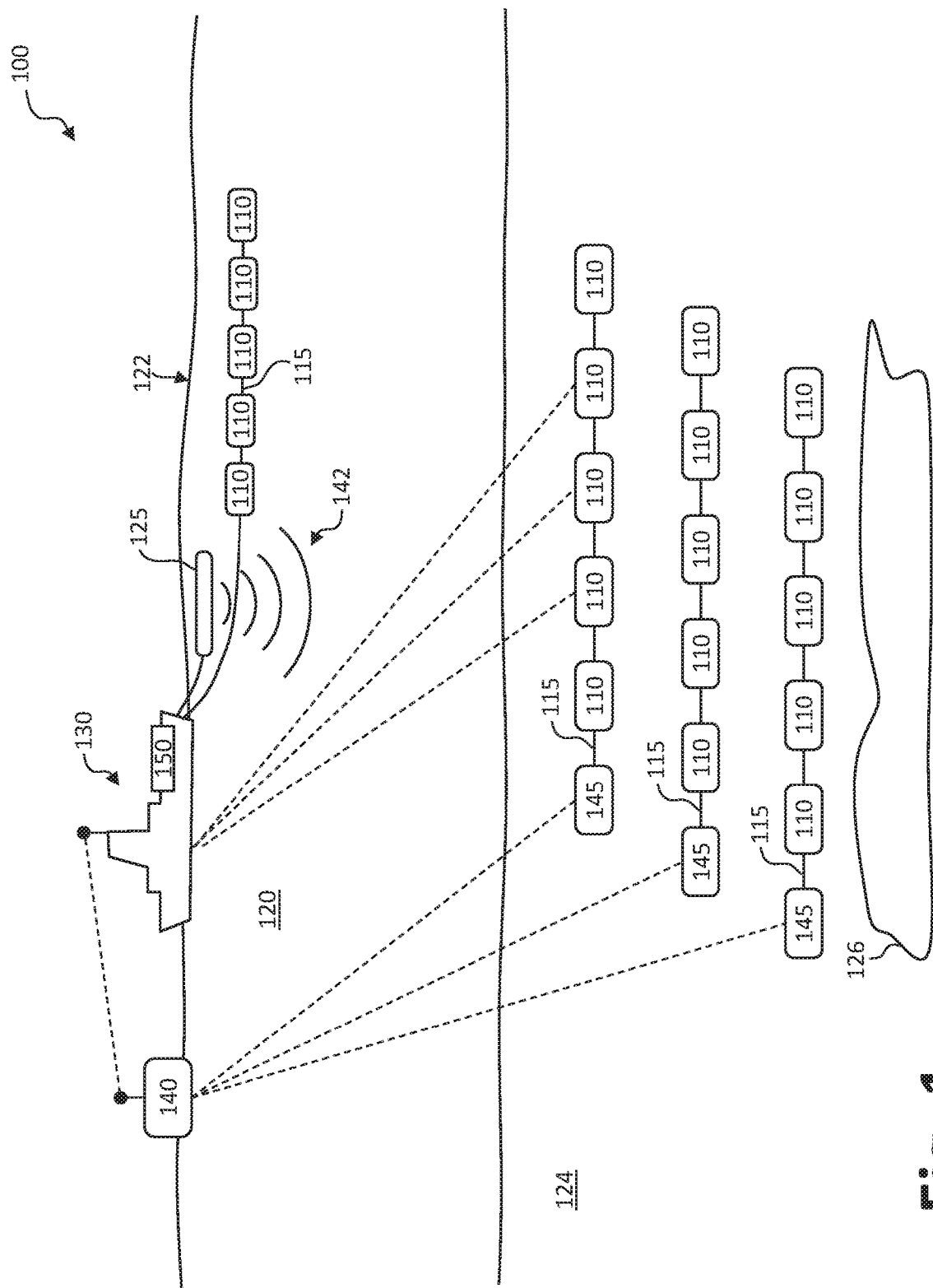
FIG. 1 is a schematic illustration of an exemplary seismic survey system configured for acquiring seismic data.

FIG. 1 illustrates a representative seismic survey (or survey system) 100, with an array of seismic receivers or autonomous nodes 110 deployed to a water column 120 along one or more ropes or cables 115. The water column 120 extends from a top surface 122 to the ocean floor or other bottom surface 124 above a petroleum reservoir or other subsurface structure 126 of interest to the seismic survey.

Depending on application, ropes or cables 115 can be towed through the water column 120 behind one or more seismic vessels 130, using a suitably adapted seismic survey deployment system 150. Suitable seismic vessels 130 can also be configured to deploy nodes 110 to the seabed or other bottom surface 124, e.g., with nodes 110 distributed along individual cables 115 above a reservoir or other subsurface structure 126, shown in FIG. 1. Nodes 110 can be seismic nodes, receivers, or other autonomous sensing devices, or, alternatively or in addition, acoustic pingers or other transponders for location identification or other information transmission attached along the cable 115. Nodes 110 can also be suspended at depth within water column 120, between top surface 122 and the ocean floor or seabed 124, or a combination of ocean-bottom cables 115, towed nodes 110 and suspended nodes 110 can be deployed.

While references may be made to a sea floor or seabed with respect to this particular example, node deployment pursuant to this disclosure is not necessarily limited to any particular body of water or other seismic medium 120. Rather, nodes 110 may be deployed to any body of water, marine, land-based, or other seismic environment 120, including oceans, lakes, rivers, etc. Accordingly, the use of the terms sea, seabed, sea floor, and the like should be broadly understood to encompass all bodies of water 120 and all marine or land-based surfaces 124 suitable for node deployment to detect propagating seismic energy or other signal or energy recordable by any type of sensor packaged as a node.

In some embodiments, individual cables 115 can be made from a synthetic or metallic material with a predefined specific density relative to the water column 120 in which cables 115 are immersed. In some embodiments, individual cables 115 may have a passive cable configuration, e.g., without internal electrical conductors or other hard-wired signal elements. In other embodiments, the cables 115 may include embedded conductors for communicating one or more of a clock signal, data signals, control signals and power among individual seismic nodes or receivers 110. Thus, each cable 115 may have a passive configuration, absent signal or power connections between the individual receivers or nodes 110 distributed along each cable 115, or an active configuration, in which signal and/or power connections are provided between the receivers or nodes 110.

In particular embodiments, nodes 110 can be deployed via an autonomous or remotely operated seismic vessel 130 operating either on the surface 122 or at a selected depth within the water column 120, or on the bottom surface 124. In other examples, one or mode nodes 110 may be equipped with steering, propulsion and/or recovery systems adapted to navigate nodes 110 through the water column 120 while disposed along cables 115, or to recover nodes 110 and cables 115 from water column 120.

Seismic nodes 110 can also be configured for external communications while deployed in water column 120, for example via a termination device or transponder 145 deployed along cable 115, with either a wired or wireless (e.g., acoustic, inductive or capacitive) data connection to a seismic hub or buoy system 140. Wireless data communications can also be provided directly between individual nodes 110 and a seismic vessel 130, and between seismic vessel 130 and one or more hub devices 140.

Suitable hub devices 140 can be equipped with a global positioning satellite (GPS) system or other positioning or navigational system to determine location and timing data for nodes 110. A suitably configured hub 140 or "master" node station 145 can also be provided with a high precision master clock to synchronize timing information for the seismic nodes 110 disposed along each respective cable 115.

Suitable hubs 140 or master node stations 145 can also be equipped with power generation, energy storage and control logic devices for performing quality checks on seismic data collected by the individual receivers of nodes 110, and operating commands selected to perform quality and station health tests, to communicate a prioritized subset of the seismic data, to turn individual nodes 110 on or off, or to enter a power saving mode.

Seismic Data Acquisition

In operation of seismic survey 100, one or more seismic vessels 130 can be configured to a tow a seismic source 125 (or source array) 125, either alone or in combination with an array of seismic receivers or nodes 110 disposed along one or more towed cables, streamers or node lines 115. Alternatively or in combination, nodes 110 can also be deployed in an array of one or more ocean bottom cables 115, e.g., as disposed on the bottom surface 124 of water column 120, or at a selected depth below top surface 122 and above bottom surface 124. Seismic cables 115 thus encompass a variety of towed streamer, ocean bottom cable, and suspended cable embodiments, and marine-based seismic system configurations.

Similarly, a plurality of source boats or other seismic vessels 130 may be employed, and cables 115 can arranged in a combination of towed, ocean bottom and suspended seismic arrays, depending on the desired configuration of seismic survey system 100. In multiple vessel embodiments, a number of towed sources 125 can be configured to operate independently, or to emit seismic energy 142 in a coordinated fashion at substantially the same time, e.g., according to a simultaneous source regime.

Depending on embodiment, each source apparatus 125 may include one or more seismic source components configured to generate seismic energy, in the form of acoustic waves 142 propagating through water column 120. For example, an air gun array or subarray 125 can be configured to generate acoustic waves 142 by emitting controlled blasts of compressed air, or other pneumatic, mechanical or electromechanical source components 125 can be used.

A portion of the seismic waves 142 propagating down through water column 120 will penetrate the ocean floor 124, and reflect from petroleum reservoir or other subsurface geological structure 126. A portion of the reflected seismic energy can propagate back up through ocean bottom 124 to seismic nodes 110 deployed along one or more ocean bottom cables 115, and back up through water column 120 to receivers or nodes 110 disposed along one or more cables 115 towed by a seismic vessel 130 or suspended at depth in water column 120.

Reflections also occur at both top surface 122 and bottom surface 124, resulting in a complex combination of upward-propagating and downward-going seismic wavefield components. Deghosting and other advanced processing techniques are thus applied to the resulting seismic data acquired by nodes 110, in order to generate images of the subsurface layers and other relevant geological structures. The images can be analyzed by geologists, engineers and other industry users to identify relevant features of subsurface reservoirs 126 and other geological structures likely to include hydrocarbons or other natural resources, and to locate and characterize other subsurface geology of interest.

Seismic Node Deployment

In many situations, it may be preferable to attach the seismic nodes 110 to the cable 115 when the receiver sensor array is deployed and detach the nodes 110 from the cable 115 when the receiver sensor array is retrieved. Doing so provides a number of advantages. First the cable 115 can easily be coiled on spools once the nodes 110 are removed. If the nodes 110 were permanently attached to the cable 115, it would be difficult to store the cable 115 without damaging the nodes 110. Further, it would be difficult to pass the cable 115 with attached nodes 110 through directional and drive pulleys necessary to deploy the cable 115 into and retrieve the cable 115 from the water column 120. Additionally, it is significantly easier to clean, service, recharge, and download data from the nodes 110 if they are detached from the cable 115. For example, once detached, the nodes 110 can be placed into charging and data download stations. Such would be extremely difficult to do if the nodes 110 remain attached to the cable 15.

Figure 2:
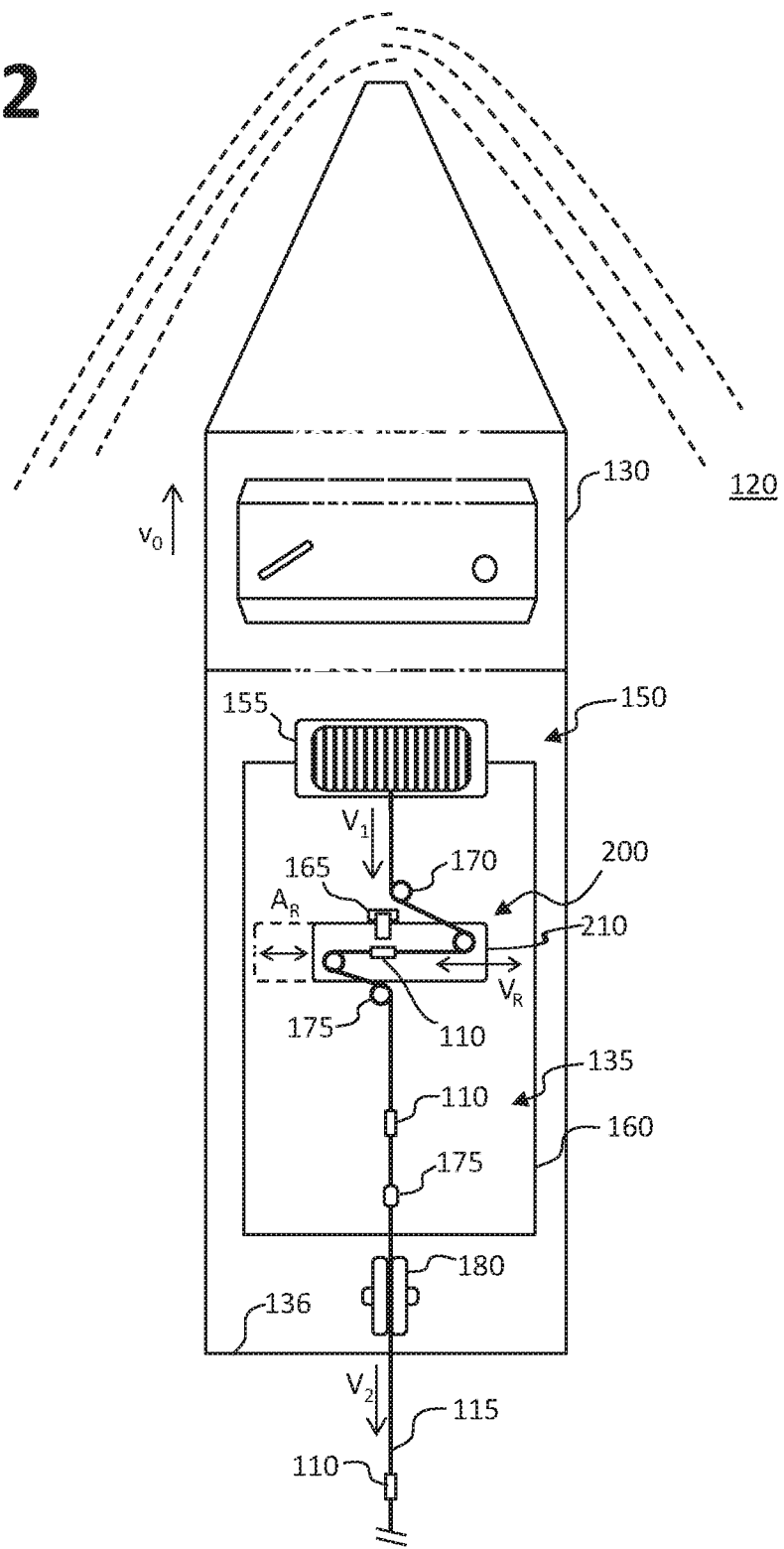
FIG. 2 is a top plan view of a representative seismic node deployment system, mounted on the back deck of a seismic vessel.

FIG. 2 is a top plan view showing a representative seismic survey deployment system 150, e.g., mounted on the back deck area 135 of a seismic vessel 130. Depending on embodiment, seismic survey deployment system 150 can include a cable spool, winch or cable supply 155 for a corresponding cable 115, with a node handling and attachment system 160 including a cable buffering apparatus 200 for attaching nodes 110 to cable 115, e.g., disposed between forward and aft cable guides or pulleys 170 and 175. A node positioning/retrieval mechanism 165 can be configured to position the seismic nodes 110 with respect to the cable 115 for attachment and detachment, and a powered sheave system 180 can be configured for controlling the speed and tension of cable 115 as nodes 110 are deployed to and recovered from the water column 120.

In some embodiments, a single-cable type node deployment system 150 can be provided, and seismic vessel 130 may take the form of a chase ship or unmanned autonomous vessel (UAV). Alternatively a plurality of deployment systems can be arranged on the back deck of the seismic vessel 130, in order to deploy an array of seismic nodes 110 on multiple ropes or cables 115, as described below.

As shown in FIG. 2, spool system 155 supplies a rope or cable 115 to the respective node attachment system 160 via one or more forward cable guides or pulleys 170. Nodes 110 are attached to selected positions along each cable 115 via the node attachment system 160, and deployed along cable 115 running from node attachment system 160 to sheave 180 via one or mode aft cable guides or pulleys 175. Alternatively, the cables 115 may run substantially directly from spool 155 to node attachment system 160 or from node attachment system 160 to sheave 180, or both, and one or more of the cable guides or pulleys 170 and 175 may not be utilized.

Sheave system 180 manages the tension in cable 115 as nodes 110 are deployed to or recovered from water column 120, with nodes 110 disposed in the selected positions along cable 115. In some examples, nodes 110 are deployed as cable 115 is payed out over the aft end or stern 136 of seismic vessel 130, as illustrated in FIG. 2. Nodes 110 and cable 115 can also be payed out and deployed over the side of vessel 130, or over the bow.

The node attachment system 160 is configured to manage the speed of cable 115 while nodes 110 are attached. In the particular embodiment of FIGS. 2 and 3, the cable buffering apparatus 200 of the node attachment system 160 utilizes a reciprocating carriage and pulley mechanism configured to vary the speed of cable 115 at the node attachment location (or attachment point A), with the carriage 210 moving back and forth at a reciprocating velocity $\pm V_R$ in order to attach nodes 110 to cable 115 at substantially zero relative speed, or as a substantially reduced speed as compared to the cable overboarding speed, as described herein.

Speed typically refers to the absolute value or magnitude of a given velocity, while the velocity may be positive, negative or zero. For reciprocating components such as carriage 210, the speed may also be quantified in terms of a maximum value $V_R$, while it is understood that the carriage velocity varies between positive and negative values $\pm V_R$. Similarly, an amplitude $A_R$ can be used to describe the maximum absolute displacement, while the position of carriage 210 varies between $\pm A_R$. Depending on context, speed and velocity are also sometimes used interchangeably, and the terms should not be construed as limited to any particular definition, except where expressly stated.

More generally, the attachment speed at which cable 115 travels when nodes 110 are attached can be substantially different from the cable delivery speed $v_1$ at which cable 115 is provided by spool 155, and from the cable overboarding speed $v_2$ at which cable 115 is payed out into water column 120. In some embodiments, for example, the cable delivery speed $v_1$ and the overboarding speed $v_2$ may be substantially the same, e.g., in a range of up to about 2.5 m/s or more, consistent with the navigational speed $v_0$ of vessel 130 with respect to the surrounding water column 120, while deploying nodes 110 along cable 115. Alternatively, the navigational speed may vary, e.g., from about 1 m/s or less to about 5 m/s or more, or from about 2 to 10 knots.

In contrast to other designs, however, node attachment mechanism 160 is configured to vary the velocity of cable 115 at attachment point A, so that nodes 110 can be attached when the adjacent portion of cable 115 is travelling at a substantially lower relative speed, or at substantially zero speed, e.g., as measured with respect to back deck 135.

The node attachment system 160 also functions as a cable buffering system, which can be used to stop or slow the cable 115 at selected positions, controlling the on-board length of the cable 115 to manage and maintain tension without substantially changing the overboarding or recovery speeds at the sheave or winch 180, or the cable spool payout speed at spool 155. For example, if the cable 115 or a node 110 gets caught or snagged on an object during either deployment or retrieval, or if a node is not suitably attached or detached, the cable buffer apparatus 200 can be used to manage length and tension in the cable 115 until the obstacle along the cable 115 or the node 110 is released, or other corrective measures can be taken.

The buffer rope length within the cable buffer apparatus 200 can thus be managed to reduce tension and stress on the spool, winch, and sheave components 155 and 180, and/or to control or maintain substantially constant tension and/or speed of payout at the spool 155 and deployment/recovery at the sheave 180. In particular applications, a snag or other obstacle such as an improperly attached or detached node 110 may be disposed along the cable 115, with the cable buffering apparatus 200 configured to manage a buffer length of the cable 115 in order to maintain the speed or tension at which the cable 115 is provided by the cable supply 155, or at which the cable 115 is deployed to or recovered from the water column by the sheave or winch 180, or both, while the snag or other obstacle is disengaged. In general, the winch speed in combination with one or more buffering apparatus 200 may be adjusted to facilitate node attachment and detachment and to manage removal of snags or other obstacles on the cable 115.

For example, the node attachment system 160 can be provided with a reciprocating carriage and pulley mechanism 210 that travels back and forth with position amplitude $A_R$, and at a maximum speed $V_R$ of about half the overboarding speed ($V_R \approx \pm \frac{1}{2} V_1$). In this embodiment, the attachment speed may be approximately zero, as defined by the speed of cable 115 at the attachment point or location A, when a node 110 is attached. Alternatively, the reciprocating carriage speed $V_R$ may vary, and the attachment speed will vary according. More generally, due to the reciprocation of the cable carriage apparatus 210, the speed of the cable 115 may be substantially reduced relative to the node 110 or the cable 115 may be substantially stopped for a period of time defined by the reciprocating velocity $V_R$ and amplitude AR, thereby facilitating safe and secure attachment of the node 110 to the cable 115.

The maximum absolute value $V_R$ of the reciprocating or alternating carriage velocity $\pm V_R$ can also be defined with respect to the cable delivery or pay out speed $v_1$, as opposed to the overboarding speed $v_2$. On average the cable delivery and payout speeds may be substantially the same (that is, $v_1 \approx v_2$), and in one embodiment the cable delivery speed $v_1$ and the overboarding speed $v_2$ can be held substantially constant during deployment of nodes 110 to water column 120, and they may be substantially similar to the navigational speed $v_0$ of vessel 130. In an alternative embodiment, the overboarding speed $v_2$ may be held substantially constant while the cable delivery speed $v_1$ may vary to facilitate the reciprocating movement of the cable carriage apparatus 210, and attachment of node 110 to cable 115.

Figure 3:
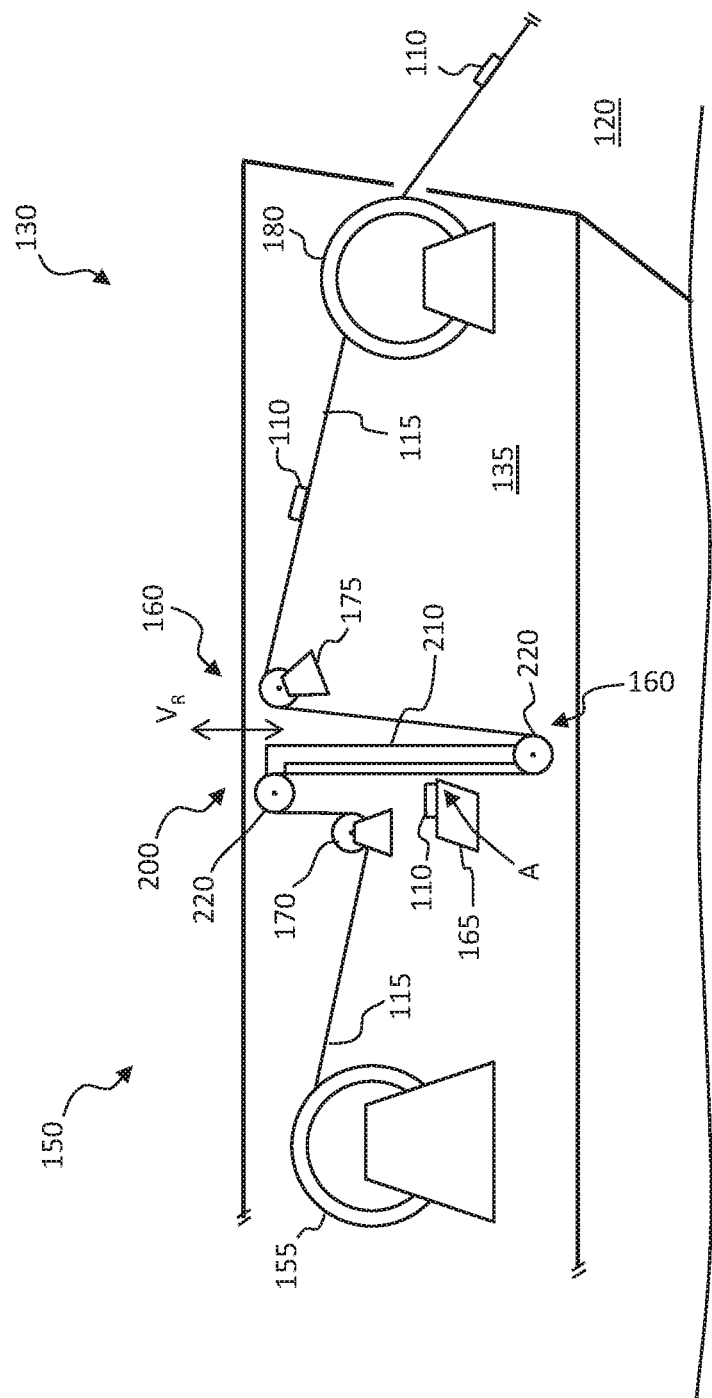
FIG. 3 is a side perspective view of the node deployment system, with a single-pass cable management configuration.

FIG. 3 is a side view of a deployment system 150 configured on the back deck 135 of a seismic vessel 130, with a single-pass node attachment system or apparatus 160. As shown in FIG. 3, a winch or spool system 155 provides cable 115 to the node attachment system 160 via one or more cable guides or pulleys 170. Cable 115 makes a single pass through the cable buffering apparatus 200, e.g., between first and second pulleys 220 attached to a reciprocating carriage or frame 210.

Nodes 110 are positioned adjacent to the cable 115 by a positioning and retrieval apparatus 165, and attached to the cable 115 when the adjacent section of cable 115 has a desired velocity. For example, nodes 110 may be attached to the cable 115 via a clamping mechanism or lanyard when the adjacent section is substantially stationary with respect to back deck 135, or at a substantially reduced velocity as compared to the cable payout velocity $V_1$ at spool system 155, or with respect to the overboarding velocity $V_2$ at which nodes 110 are deployed into water column 120 along cable 115.

As illustrated in FIG. 3, the magnitude of the relative velocity of cable 115 adjacent seismic node 110 depends upon the reciprocation speed $V_R$ and the number of passes cable 115 makes over pulleys 220. The relative velocity also changes during the reciprocation cycle, increasing or decreasing according to the speed and direction of motion of the carriage 210.

In the "single-pass" configuration of FIG. 3, cable 115 passes over a first (single) pulley 220 at one end of reciprocating carriage 210, and a second (single) pulley on the opposite end of reciprocating carriage 210. As carriage 210 reciprocates, cable is either taken up or released on both sides of the respective pulleys 220, depending on the direction of motion. If the magnitude of the reciprocation speed $V_R$ is half the cable pay out velocity $v_1$ (or the overboarding velocity $v_2$), the section of cable 115 adjacent node will thus be stationary for at least part of the reciprocation cycle. By picking a substantially square wave form for reciprocation velocity $V_R$, as opposed to a sinusoidal or harmonic form, the period of relatively zero (or substantially reduced) relative velocity can be increased as a fraction of the reciprocation period.

Depending on deployment speed and the reciprocation amplitude, this can provide a window on the order of a quarter or more of the reciprocation period during which node 110 can be attached to cable 115 as substantially zero relative velocity; that is, while both node 110 and the adjacent section of cable 115 are substantially stationary with respect to back deck 135. Alternatively, the reciprocation waveform can be harmonic, and nodes 110 can be attached at a relative velocity minimum defined during the motion of carriage 210, e.g., when the carriage is moving upwards or downwards relative to the back deck 135, depending on configuration, and cable 115 is substantially stationary with respect to node 110 at attachment point A.

In other embodiments the relative attachment speed can be selected to be substantially lower than either the cable pay out speed $v_1$ as defined at spool 155, or the overboarding speed $v_2$ as defined aft of the sheave system 180. More generally, the relative speed of the cable adjacent attachment location A varies between higher and lower values different points during the reciprocation cycle of carriage 210, and the attachment speed can be selected accordingly.

Figure 4:
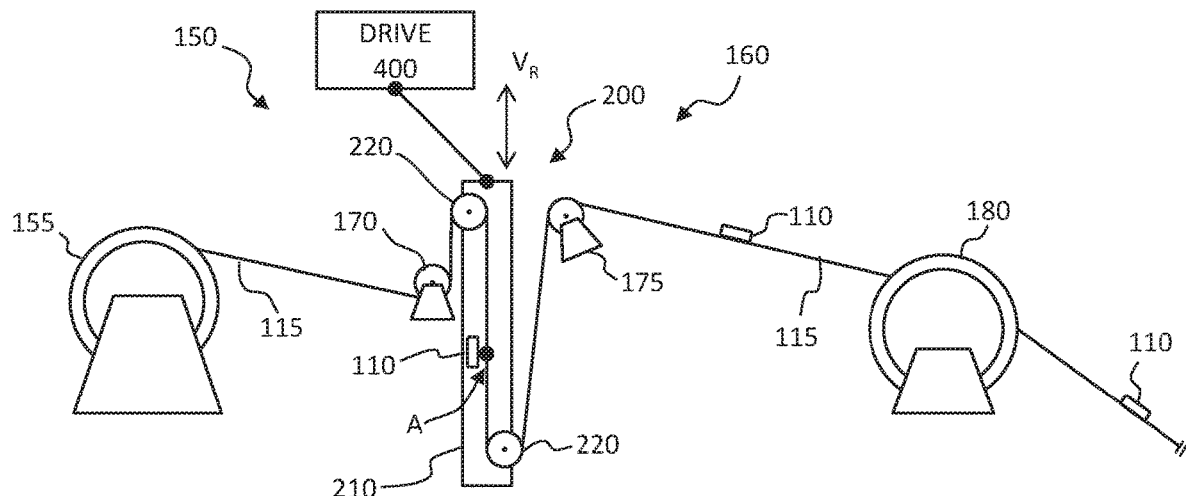
FIG. 4 is a simplified schematic view of the node deployment system in FIG. 3.

FIG. 4 is a simplified schematic view of the node deployment system in FIG. 3. As shown in FIG. 4, node attachment system 160 is provided in a single-pass arrangement with two pulleys 220 disposed on opposite ends of a reciprocating table or plate-type carriage 210. While carriage 210 is illustrated in a horizontal with respect to back deck 135 in FIG. 3, this is a matter of drawing convention, and both horizontal and vertical orientations are encompassed. Similarly, while the direction of reciprocation is shown generally perpendicular or orthogonal to the overall path of cable 115 between the spool supply 155 and sheave 180, longitudinal, transvers, and skew orientations are also encompassed.

A mechanical drive system 400 is also illustrated, and configured to drive carriage 210 into reciprocating motion with velocity magnitude $V_R$, as defined relative to the back deck and fixed components such as cable spool system 155 and sheave 180. Drive 400 can be configured to drive carriage 210 in periodic motion with a substantially square, sawtooth, or other non-sinusoidal velocity or position waveform, in order to increase the fraction of the reciprocation period during which cable 115 is substantially stationary adjacent node 110 at attachment point A. Alternatively, the reciprocation can be substantially harmonic and sinusoidal. In other embodiments, the periodic motion may occur at variable or intermittent intervals with no fixed or regular time frame between occurrences, but rather occur upon a command to signal to attach a node 110.

In one embodiment, the drive 400 may be configured to perform a single reciprocation cycle upon receiving a command from a control system controlling node deployment to facilitate attachment of a node. A series of such commands may be issued at varying or consistent time intervals, in order to attach nodes 110 at desired locations on the cable 115. Similarly, the cable spool system 155 can also be controlled to vary the speed at which cable 115 is supplied in cooperation with the motion of carriage 210 determined by drive system 400, or the supply speed can be substantially constant during deployment, as described above.

Drive 400 can also be configured to adjust the period of reciprocation, in order to attach nodes 110 with a desired spacing along cable 115. Both the magnitude of the reciprocation velocity and the amplitude of the motion can also be adjusted, according to the pay out and overboarding speed of cable 115, and the desired time window for attaching nodes 110 at a desired location along cable 115, as a desired relative velocity.

Figure 5:
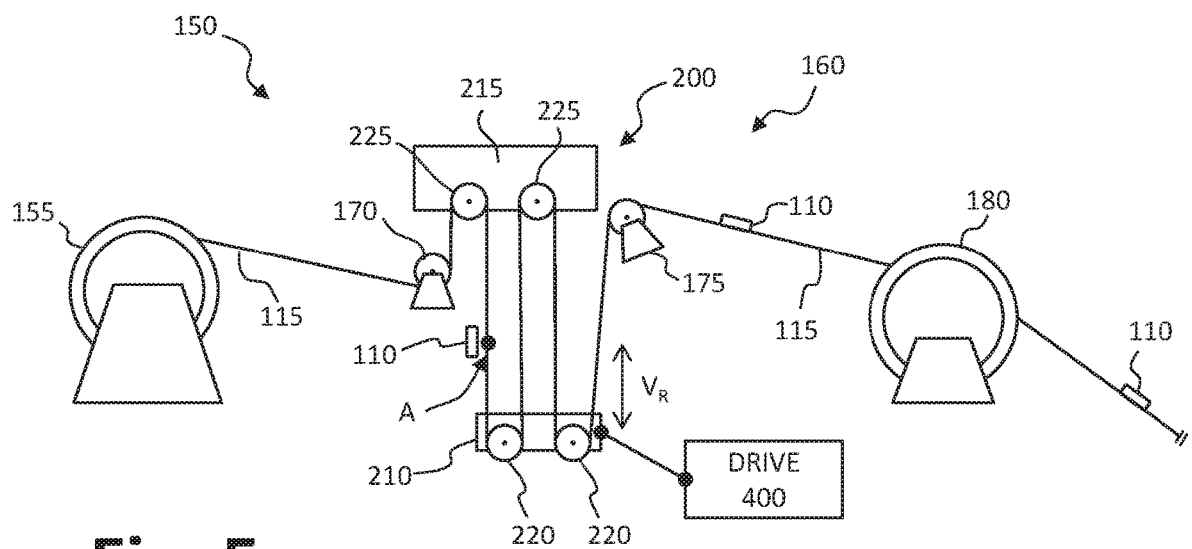
FIG. 5 is a schematic view of the node deployment system, in a two-pass fixed pulley configuration.

FIG. 5 is a schematic view of the node deployment system 150 in a configuration with fixed pulleys 225 attached to a stationary structural member 215, and moving pulleys 220 attached to a reciprocating carriage 210. This is a two-pass embodiment, where substantially zero cable velocity can be achieved at attachment point A with carriage 210 reciprocating at approximately one-quarter the cable pay out or overboarding velocity (e.g., $V_R \approx v_1/4$ or $V_R \approx v_2/4$). A mechanical drive system 400 is provided to drive carriage 210 in reciprocating motion with a desired amplitude, period, and cyclical wave form, as described above.

Figure 6:
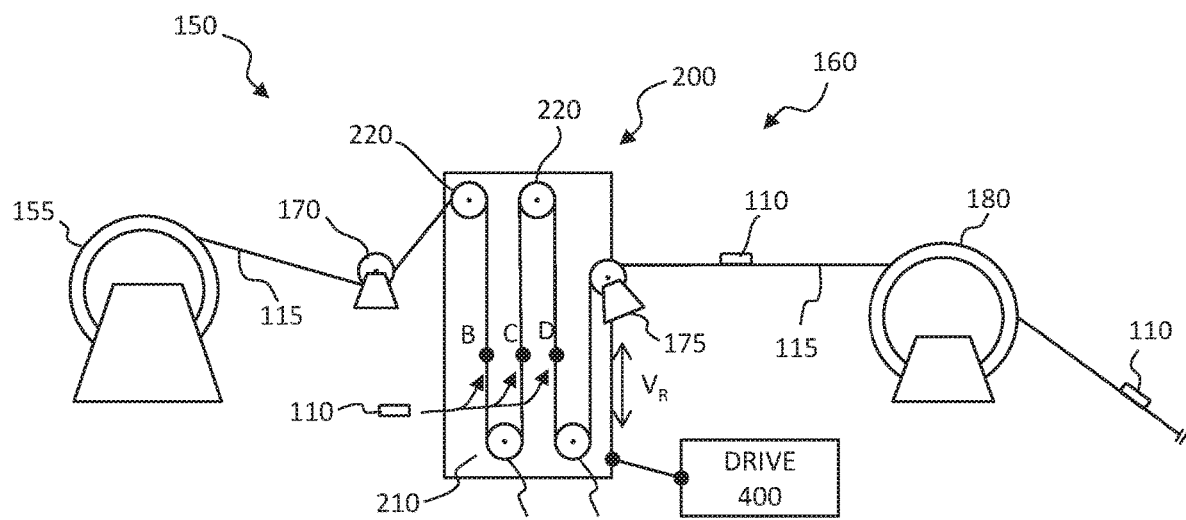
FIG. 6 is a schematic view of the node deployment system in FIG. 5, with a movable carriage.

FIG. 6 is a schematic view of the node deployment system 150 in a two-pass configuration with four pulleys 220 fixed to the reciprocating carriage 210. Similar to the two-pass, fixed pulley embodiment of FIG. 5, a suitable mechanical drive 400 can be configured to drive carriage 210 with a reciprocating velocity magnitude $V_R$ of about one-fourth the cable pay out velocity $v_1$ or the overboarding velocity $v_2$, in order to provide a time window within the reciprocation period during which a portion of the cable 115 is substantially stationary adjacent node 110, at attachment point A.

The two-pass configuration of FIG. 6 operates similarly to the single-pass configuration of FIG. 5. One additional feature is that there are multiple positions B, C, D at which the cable 115 will have substantially lower relative speed (or substantially zero velocity) relative to the back deck 135, during a particular phase of the reciprocating motion of carriage 210. As shown in FIG. 5, for example, there is a phase at which the rope or cable 115 can have lower or zero velocity relative to the node 110 at attachment point A. This is because when the carriage 210 moves toward the fixture 215, the bottom left pulley 220 loses slack, which has to pass through node attachment system 200 and be overboarded. In FIG. 6, the node 110 can be attached at any one of the locations B, C and D. This is because slack lost by the bottom left pulley 220 can be picked up by the top right pulley 220.

Figure 7:
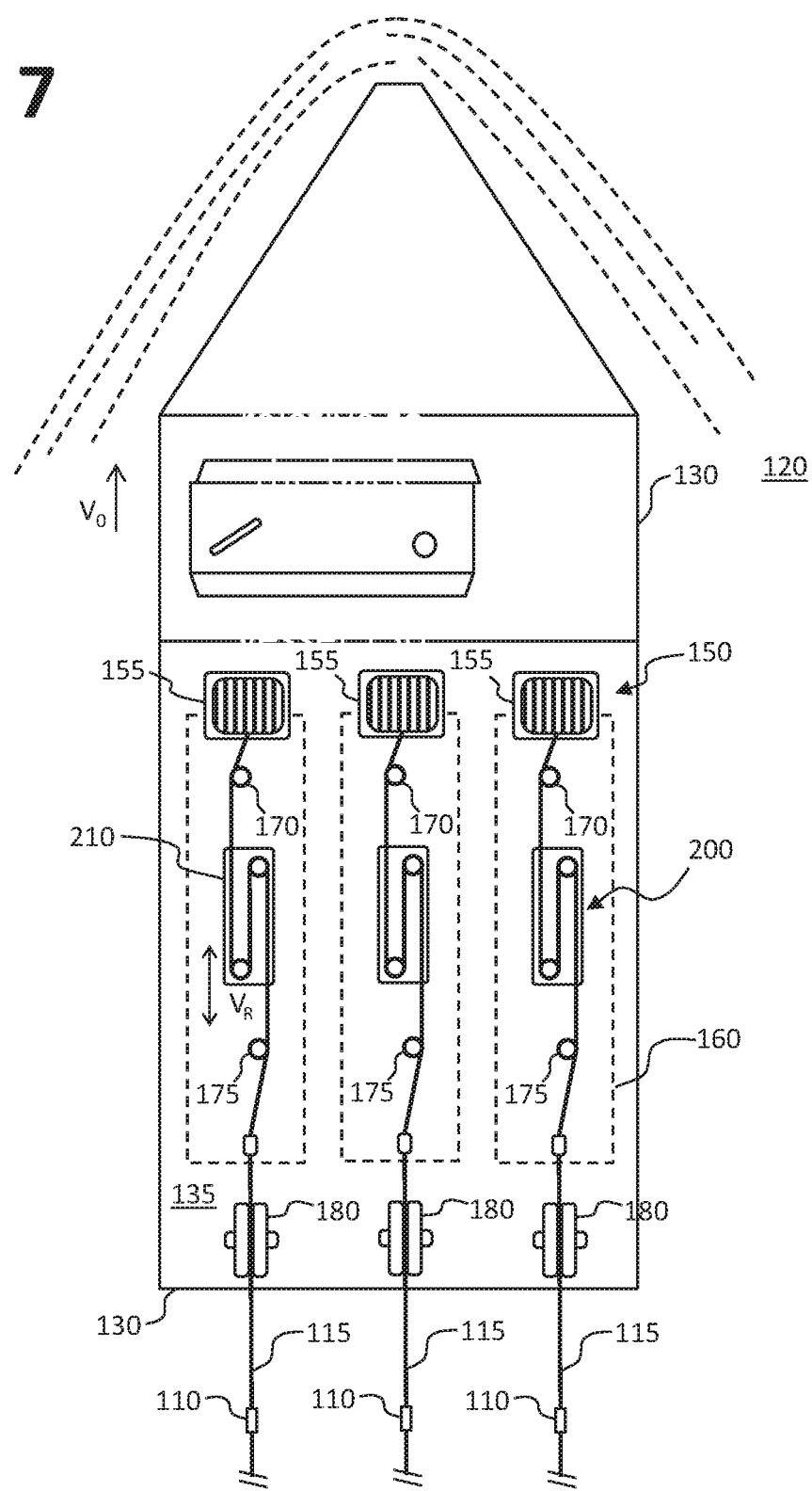
FIG. 7 is a top plan view of a multiple cable seismic survey deployment system, mounted on the back deck of a seismic vessel.

FIG. 7 is a top plan view of a multiple cable seismic survey deployment system 150, mounted on the back deck of a seismic vessel. As shown in FIG. 7, deployment system 150 may include a plurality of two or more individual cable supply systems 155, with respective node handling systems 160 configured for storing and providing a number of nodes 110 for attachment to a respective plurality of cables 115.

In this arrangement, node attachment system 160 can be longitudinally oriented, with carriages 210 reciprocating at sped $V_R$ substantially along the major path of each cable 115 between the respective cable supply spool 155 and sheave system 180. Alternatively the reciprocation can be substantially perpendicular, skew or transverse with respect to the forward and aft sections of cable 115, and either horizontal with respect to the back deck 135 or in a vertical direction, as described above.

More generally, deployment system 150 can be adapted to provide one or more attachment locations at which the relative velocity of cable 115 is substantially zero with respect to node 110 and back deck 130, or substantially less than the overboarding velocity, for a selected time window during the reciprocation period. The time window depends on the carriage velocity and displacement amplitude, and can range from a short or momentary attachment window ranging from a few percent of the reciprocation period to up to 10-25% of the period, or a more substantial portion ranging from 25% up to 50% or more, depending on the time profile of the reciprocating motion.

The pulley and cable guide configuration can also be adapted to reduce the maximum reciprocating speed $V_R$ of the carriage 210, both in an absolute sense with respect to back deck 135 and as a fraction of the cable delivery speed $v_1$ and overboarding velocity $v_2$. More generally, the time window during which the relative speed of cable 115 is reduced proximate the various attachment locations A, B, C, D can be increased to an absolute range of up to 1-2 seconds or more, up to 2-5 seconds or more, up to 5-10 seconds or more, or up to 10-15 seconds or more, depending on the carriage velocity and displacement amplitude, and the time profile of the reciprocating motion, as described above.

In addition, the pulley and guide configuration can be adapted to provide multiple attachment points A, B, C, D, for staging sequential node attachment at selected locations along cable 115, increasing deployment efficiency for seismic array configurations with high numbers of nodes 110. The locations can also be selected to reduce interference between attached nodes 110 and the pulley system, for example by selected placement on carriage 210, or by using a combination of fixed and reciprocating pulley components as shown in FIG. 5.

The carriage and pulley arrangement can also be configured so that the maximum reciprocating speed $V_R$ of the carriage 210 is about half or less the speed of the cable $v_2$ at which the seismic nodes are deployed, or a similar fraction of the cable supply delivery $v_1$, for example in a single-pass configuration. The maximum reciprocating speed $V_R$ can also be about one quarter or less the cable delivery speed $V_1$ or overboarding speed $V_2$, for example in a two-pass configuration. More generally, the cable buffering apparatus 200 can be configured with a combination of pulleys 220 attached to the carriage 210 and stationary pulleys 225 attached to a stationary fixture 215, so that the maximum reciprocating speed $V_R$ of the carriage 210 is a fraction 1/n or less of the speed of the cable at which the seismic nodes are deployed, e.g., where n is between two and eight, inclusive, or when n is eight or more.

Figure 8:
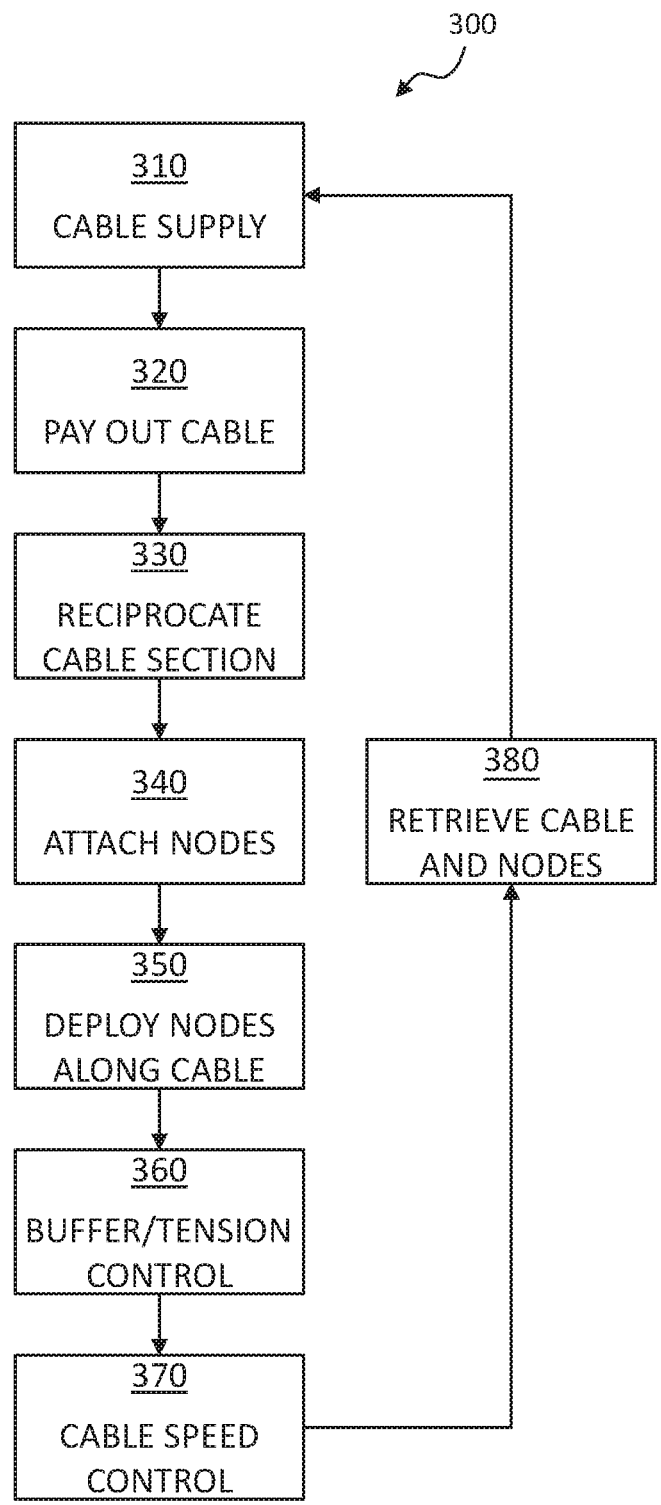
FIG. 8 is a block diagram illustrating a method of seismic node deployment.

FIG. 8 is a block diagram illustrating a method 300 of seismic node deployment, e.g., according to deployment system 150 as descried herein. As shown in FIG. 8, method 300 includes one or more steps of providing a cable (step 310), paying out an end of the cable to a water column (step 320), driving a section of the cable in reciprocating motion (step 330), and coupling one or more seismic nodes to the cable (step 340) for deployment (step 350), where the attachment speed can be reduced relative to the overboarding speed at which the end of the cable is payed out. The steps may be performed in any order or combination, with or without one or more additional steps such as buffering the cable and controlling tension in the cable (step 360), controlling the speed at which the cable is provided (step 370), and retrieving the nodes (step 380), and any additional steps described herein.

Providing the cable (step 310) can be performed with a cable spool, winch or similar cable supply. The end of the cable can be payed out to the water (step 320) using a sheave system.

A section of the cable is driven in reciprocating motion (step 330) with respect to the end paying out to the water, so that the relative speed of the cable section to which the nodes are attached (step 340) is reduced relative to the overboarding speed at which the cable is paying out and the nodes are deployed (step 350). Tension can be controlled by buffering the cable (step 360) prior to deployment via a sheave system, e.g., disposed between the water column and the cable section in reciprocating motion. The speed at which the cable is supplied can also be controlled (step 370), e.g., in order to regulate tension in the cable section to which the nodes are attached.

One or more seismic node are coupled or attached to the section of cable at the reduced attachment speed (step 340), so that the attached seismic nodes are deployable to the water on the cable. For example, the attachment speed can be reduced to substantially zero with respect to the seismic node or back deck area, when the seismic node is coupled to the adjacent section of the cable.

The node attachment and deployment apparatus can also function for buffering the rope or cable length (step 360), and can be used to stop or slow the cable to manage and maintain speed and tension (steps 360, 370). For example, the buffer can be used to maintain the payout and overboarding/recovery speeds and tensions substantially constant, while varying the speed and tension at other locations on the deck, as described herein. In particular applications, a snag or other obstacle may form or be disposed along the cable, and buffering can be applied to manage the cable length in order to maintain the speed and tension at which the cable is provided, or at which the cable is deployed to or recovered from the water column, while the snag or other obstacle is disengaged.

For example, the rope or cable (or a node on the rope or cable) may get caught or snagged on something in the water, or on board the vessel. Nodes may also be improperly engaged or disengaged, forming an obstacle along the cable length. In such a case buffering can be used to manage the cable length, as well as the cable speed and tension, until the cable or node is released, the obstacle is disengaged, other corrective measures can be taken. The cable buffer length can also be managed to reduce tension and stress on the payout spool and/or on the deployment winch or sheave, and to maintain constant payout speed and/or tension during node deployment and retrieval, while maintaining personnel and equipment safety. In prior art systems without a buffering apparatus, it may be undesirable to make sudden changes in the cable speed and tension in order to remove snags and other obstacles, and it may be more difficult to accommodate such changes when they occur, without increased risk of equipment damage or loss.

Figure 9A:
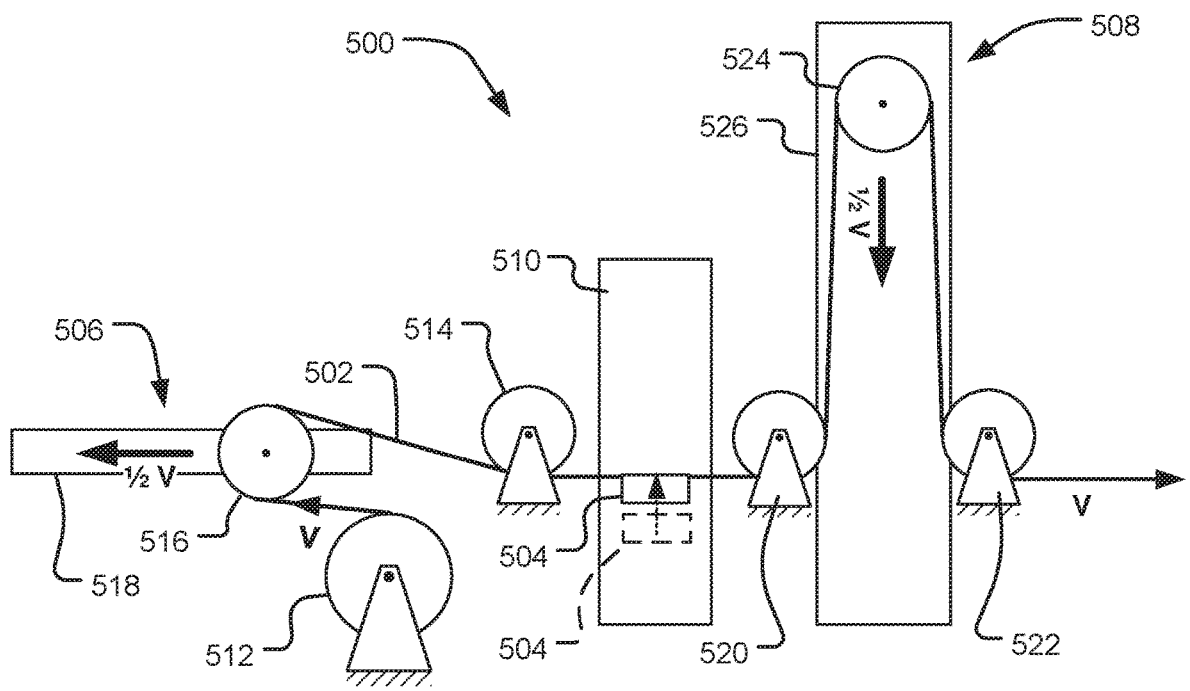
FIGS. 9A-9D are schematic diagrams depicting functional steps of an embodiment for seismic node attachment and deployment.
Figure 9B:
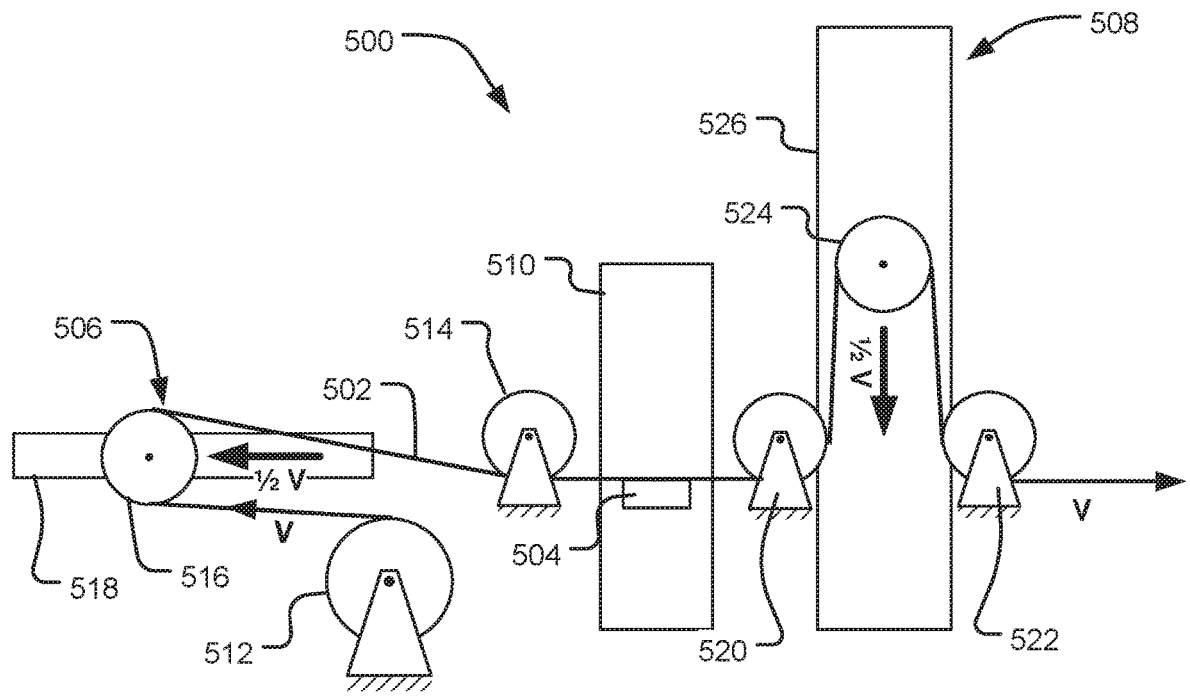

An alternative implementation of a seismic node deployment system 500 is depicted in FIGS. 9A-100. The system 500 is configured to attach and detach a plurality of seismic receiver nodes 504 onto and from a cable 502 for deployment from and return to a marine vessel. Nodes 504 can be seismic nodes, receivers, or other autonomous sensing devices, or, alternatively or in addition, acoustic pingers or other transponders for location identification or other information transmission attached at positions spaced apart along the cable 502. The system 500 may include a forward buffer system 506 and an aft buffer system 508 for controlling the relative speed of the cable 502 with respect to a node coupling device 510 for attachment and detachment of a plurality of nodes 504 to the cable 502 in spaced apart locations. The forward and aft buffer systems 506, 508 may periodically temporarily divert portions of the cable 502 to take up and pay out sections of the cable 502 to reduce the speed of a portion for node attachment. In some embodiments, the periodic diversions of the cable 502 in the forward and aft buffer systems 506, 508 may be at regular intervals. In other embodiments, the periodic diversions may occur at intermittent intervals with no fixed or regular time frame between occurrences, but rather occur upon a command to signal to attach or detach a node 504 to or from the cable 502.

The cable 502 may be stored upon a storage winch or spool 512 from which the cable 502 is payed out for deployment in the water column or wound around for storage when not in use. A traction winch or cable tensioner 514 may be positioned between the forward buffer system 506 and the aft buffer system 508 in order to maintain appropriate tension on the cable 502 as it is payed out or hauled in. The node coupling device 510 may be positioned between the cable tensioner 514 and the aft buffer system 508.

The forward buffer system 506 may include a forward pinion pulley 516 that travels laterally on a lateral rack 518. In some embodiments, a drive motor may be attached to the forward pinion pulley 516 and configured to move the forward pinion pulley 516 back and forth along the lateral rack 518. The aft buffer system 508 may include a first aft base pulley 520 and a second aft base pulley 522 both fixedly positioned adjacent to the base of a vertical rack 528. The first aft base pulley 520 may be positioned on a forward side of the vertical rack 528 and the second aft base pulley 522 may be positioned on an aft side of the vertical rack 526. An aft pinon pulley 524 may be movably attached to the vertical rack 526 and aligned between the first and second aft base pulleys 520, 522. In some embodiments, a drive motor may be attached to the aft pinion pulley 524 and configured to move the aft pinion pulley 524 up and down along the vertical rack 526.

An exemplary deployment operation of the system 500 is depicted in the series of FIGS. 9A-9D. To prepare the system 500 for operation, the cable 502 must be unwound from the spool 512 and threaded through the components. The spool 512 may be manually driven while threading the cable 502 through the system 500, i.e., through the forward buffer system 506, the cable tensioner 514, the node coupling device 510, the after buffer system 508, and through an overboarding unit (not shown in the schematics of 9A-9D). An end weight may be connected to the first end of the cable 502, typically using a deck crane (not shown).

Initially, as shown in FIG. 9A, the cable 502 is unwound from storage on the spool 512 and is threaded around the forward pinion pulley 516. The spool 512 is typically driven by a motor and functions as a winch when both coiling and uncoiling the cable 502 from the spool 512 due to the significant mass of the cable 502 and the related moment generated while the spool 512 rotates. When the cable 502 is unwound from the spool 512, the spool 512 provides tension on the cable 502 as it pays out. The forward pinion pulley 516 is movably mounted on the lateral rack 518 and may be driven laterally along the lateral rack 518 by a motor (not shown) that is under control of a control system as further described herein. In one exemplary implementation, the lateral rack 518 may include a linear array of gear teeth along its length and the motor may turn a gear that interfaces with the linear gear teeth to move the forward pinion pulley 516 back and forth on the lateral rack 518.

After winding around the forward pinion pulley 516, the cable 502 then passes through the cable tensioner 514, which pulls the cable 502 from the spool 512 at a speed synchronized with the speed of the vessel. The cable tensioner 514 may be composed of one or more pulleys through which the cable 502 passes and which are configured to provide appropriate tension on the cable 502 when deploying and retrieving the cable 502 from the water column. The one or more of the pulleys forming the cable tensioner 514 may be motor-driven with appropriate transmission gearing in order to protect the forward pinion pulley 516 and the spool 512 from excessive force that may be placed on the cable 502 by the water column.

The cable 502 next passes through the node coupling device 510, which is configured to attach a plurality of sensor nodes 504 serially onto the cable 502, typically at fixed interval spacings (and to further detach the nodes 504 from the cable 502 in an opposite operation). In one exemplary embodiment, each node 504 may be equipped with a spring-loaded coupler that clamps the node 504 onto the cable 502. The node coupling device 510 may be configured to pick a node 504 from a provided supply of nodes 504, compress the spring clamp, place the spring clamp around the cable 502, and release the spring clamp to connect the node 504 to the cable 502.

After passing through the node coupling device 510, the cable 502 may be threaded through a number of pulleys forming the aft cable buffer 508. The first aft base pulley 520 and the second aft base pulley 522 may be located at fixed positions on lateral sides of the base of the vertical rack 526 along which the aft pinion pulley 524 moves. The aft pinion pulley 524 may be driven vertically along the vertical rack 526 by a motor (not shown) that is under control of a control system as further described herein. In one exemplary implementation, the vertical rack 526 may include a linear array of gear teeth along its length and the motor may turn a gear that interfaces with the linear gear teeth to move the aft pinion pulley 516 up and down on the vertical rack 526.

As shown in FIGS. 9A-9D, the cable 502 may pass under each of the first aft base pulley 522 and the second aft base pulley 522 and pass over aft pinion pulley 516. At the lower or base end of the vertical rack 526, the aft pinion pulley 516 may pass between each of the first aft base pulley 522 and the second aft base pulley 522 to a low point of its vertical travel and disengage from contact with the cable 502. After passing through the aft cable buffer 508, the cable 502 with attached nodes 504 may be deployed into the water column via an overboarding unit (not shown).

At system start, the selected spool 512 will enter into a tension mode, and the cable tensioner 514 will start pulling out cable 502 from the spool 512 at a cable speed synchronized with the vessel speed. The aft buffer 508 will accumulate a maximum amount of cable length by moving to its upper position. At a signal for "attach node" the aft buffer 508 will start paying out from the accumulated length, thereby keeping a steady cable speed paying out from the vessel. Simultaneously the forward buffer 506 will start accumulating cable by moving forward, and thereby keep a steady cable speed out from the spool 512. Together this will keep the cable 502 stationary in the node coupling device 510 for a long enough time to attach the node 504 to the cable 502. When the aft buffer 508 reaches its complete downward or "open" position, the forward buffer 506 will stop, and the cable 502 with a node 504 connected will move toward the overboard unit. As soon as the system 500 detects that the node 504 has passed through the zone of the aft buffer 508, the forward buffer 506 will move to its aft position and the aft buffer 508 will start accumulating cable at a synchronized speed. As soon as the aft buffer 508 has accumulate a maximum length of cable 502 by reaching the upper position, the system 500 is ready for attaching another node 504.

A configuration and operation for deployment of the cable 502 and attachment of the nodes 504 as generally described above is shown in greater detail in FIGS. 9A-9D. The forward pinion pulley 516 begins in an aft position along the lateral rack 518 and the aft pinion pulley 524 begins in an upper position on the vertical rack 526. The cable tensioner 514 starts pulling cable at a constant speed. Thus, the cable 502 is unwound from the spool 512 such that it travels linearly at a constant velocity V. In some implementations, the linear velocity of the cable 502 may be up to 5 knots (2.5 m/s). When it is determined that the proper separation distance along the cable 502 between nodes 504 is reached, the forward pinion pulley 516 begins moving forward on the forward rack 518 at a speed of substantially ½V to thereby take up the length of cable 502 unwinding from the spool 512. Simultaneously, the aft pinion pulley 524 begins moving downward on the vertical rack 526 at a speed of substantially ½V to thereby pay out the cable 502 previously extended along the vertical rack 526 to be overboarded at a velocity V. As the forward and aft pinion pulleys 516, 524 move in their respective directions at half the speed of the cable 502 as it pays out, the relative speed of the cable 502 with respect to the node coupling device 510 is 0V, i.e., the portion of the cable 502 passing through the node coupling device 510 is effectively not moving in that reference frame.

By effectively halting the movement of the cable 502 through the node coupling device 510, the node 504 can be easily attached to the desired location on the cable 502 during the time it takes the forward and aft pinion pulleys 516, 524 to traverse lengths of the lateral and vertical racks 518, 526, respectively. Typically the time for such traversal is on the order of several seconds depending upon the length of the racks 518, 526 and the speed of the cable 502, e.g., if the overboarding velocity V is 5 knots (2.5 m/s). This is adequate time for the node coupling device 510 to pick a node 504 from a supply, compress the spring clamp, place the open clamp around the cable 502, and release the spring clamp on the node 504 to complete the attachment of the node to the cable 502.

Figure 9C:
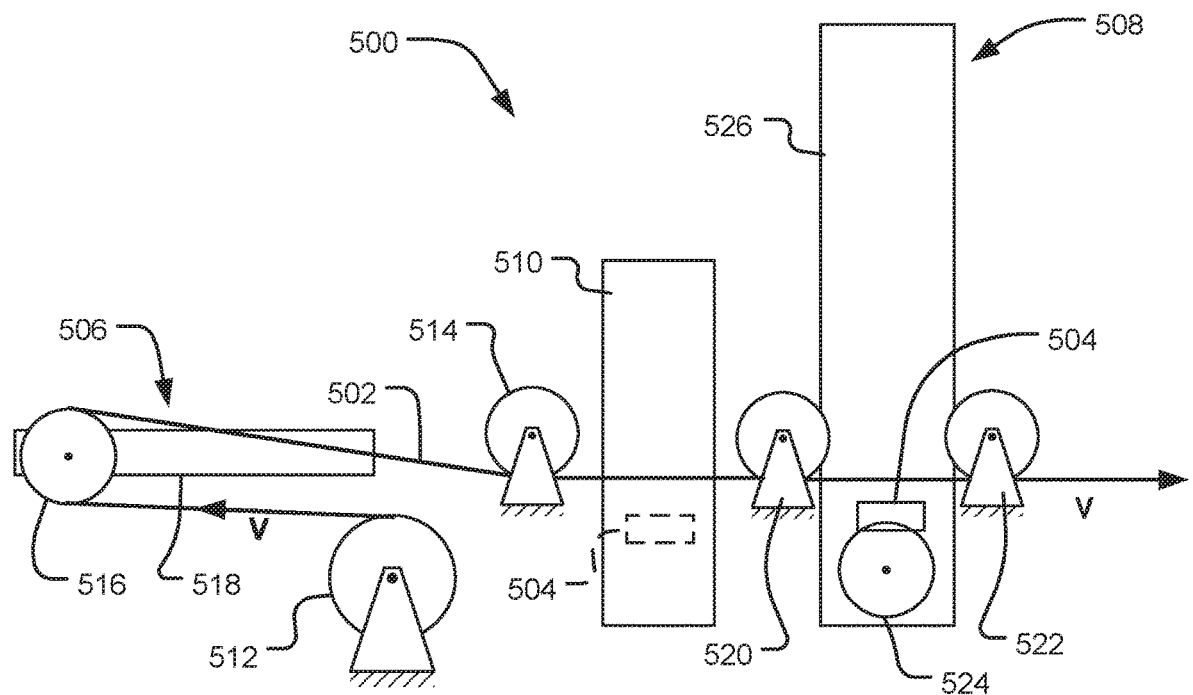

Once the node 504 is attached to the cable 502, the forward and aft pinion pulleys 516, 524 have completed their traverse of the lateral and vertical racks 518, 526, respectively. At this point the aft pinion pulley 524 is positioned below the first and second aft base pulleys 520, 522 as shown in FIG. 9C and is no longer in contact with the cable 502. While the forward and aft pinion pulleys 516, 524 are stationary in the forward and bottom positions on the lateral and vertical racks 518, 526, respectively, the cable 502 continues to be pulled by the cable tensioner 514 and travels through the entire system 500 at the full, constant deployment speed V. As shown, the coupled node 504 is attached to extend from the bottom of the cable 502. In this manner, the node 504 does not interfere with either of the first and second aft base pulleys 520, 522, nor does the node 504 interfere with the aft pinion pulley 524, which is positioned at a sufficient distance beneath the path of the cable 502 for clearance of the node 504 over the top of the aft pinion pulley 524. Also at this time, a new node 504' may be placed within the node coupling device 510 in a position for picking and placement of the new node 504' on the cable 502.

Figure 9D:
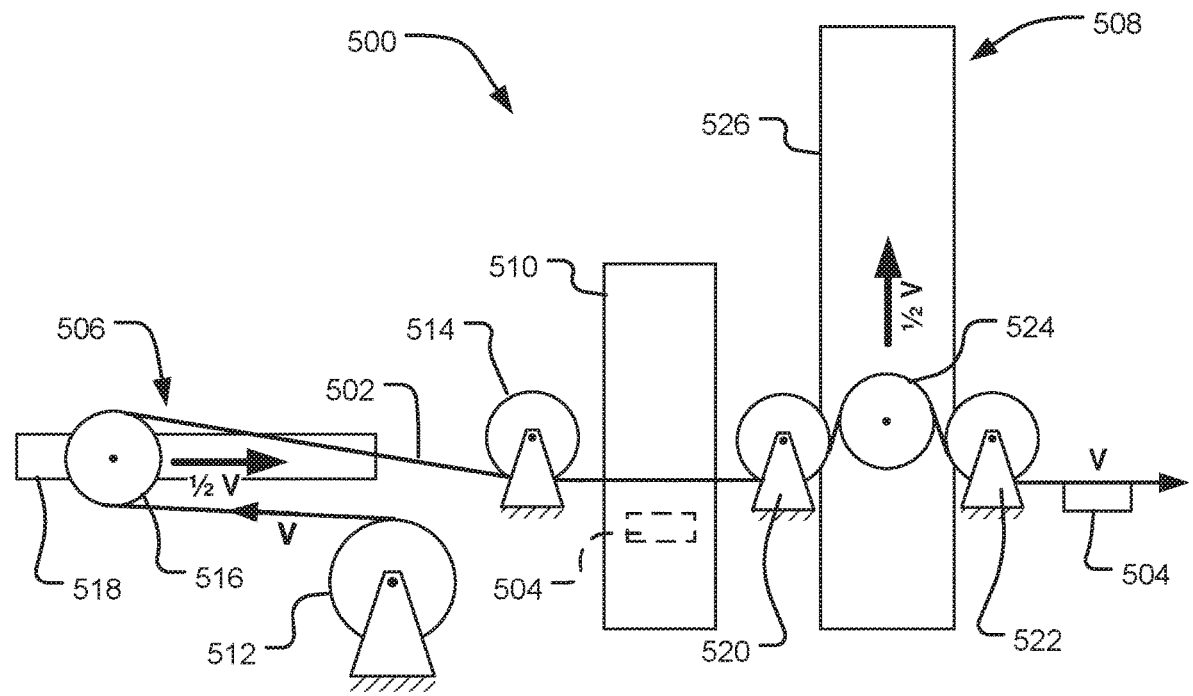

Once the node 504 has traveled beyond the second aft base pulley 522, the forward and aft pinion pulleys 516, 524 begin traveling along the lateral and vertical racks 518, 526, respectively, typically at a speed of ½V, to their starting positions at the forward and top positions on the lateral and vertical racks 518, 526, respectively, as shown in FIG. 9D. The cable 502 maintains its overboarding speed of V at the stern of the marine vessel as the forward and aft pinion pulleys 516, 524 move. Once the forward and aft pinion pulleys 516, 524 reach their starting positions, the cable 502 is payed out at velocity V along its length until the control system for the seismic node deployment system 500 determines that the desired separation distance between nodes 504 is reached and the attachment cycle begins again as described above beginning with FIG. 9A.

During the entire node attachment cycle, the velocity V of the cable 502 unwinding from the spool is the same as the velocity V of the cable 502 when overboarding off the stern of the marine vessel into the water column and the this velocity V remains constant throughout the cable deployment process.

Figure 10A:
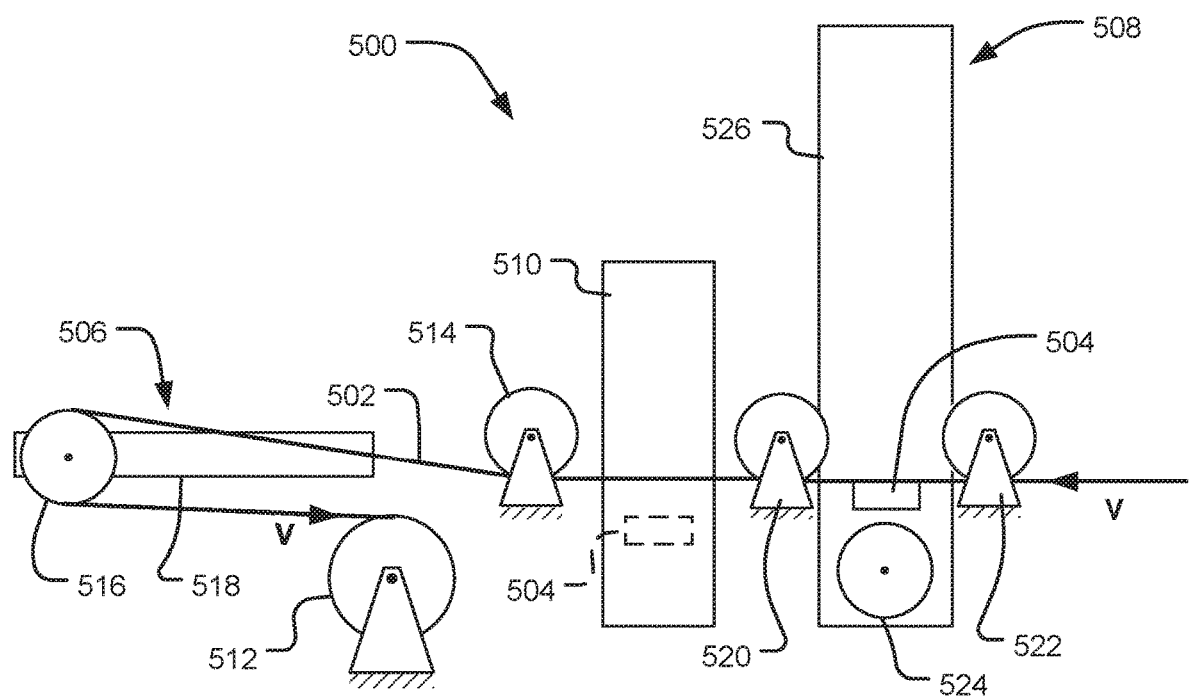
FIGS. 10A-10C are schematic diagrams depicting functional steps of an embodiment for seismic node retrieval and detachment.
Figure 10B:
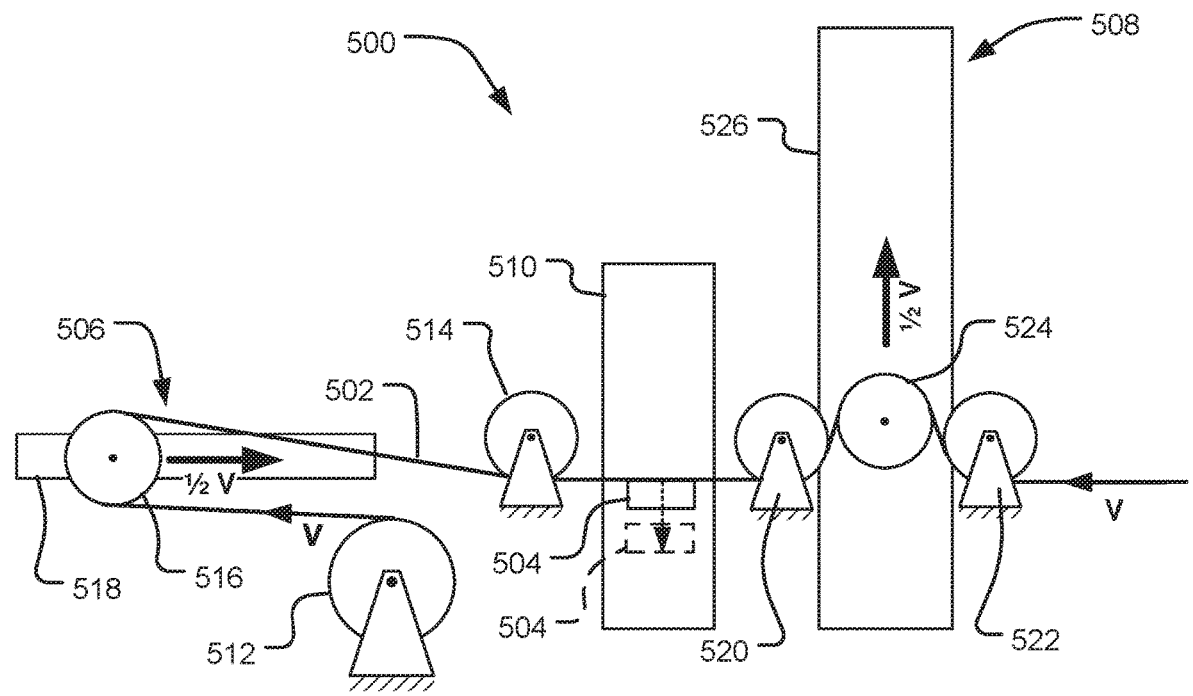
Figure 10C:
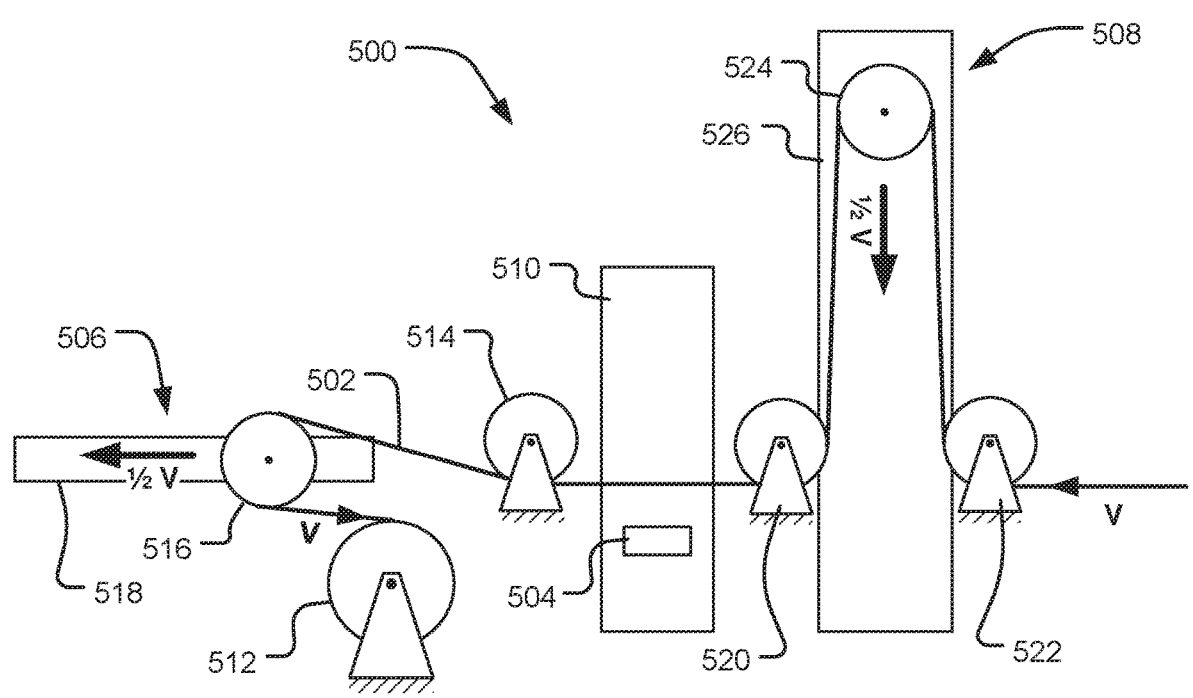

FIGS. 10A-10C depict a node detachment process performed by the seismic node deployment system 500. At the start of retrieval of the cable 502 from the seismic medium (e.g., the body of water) the aft buffer 508 will be in lower or "open" position, the cable tensioner 514 will reel the cable 502 in at a synchronized speed with the vessel. The spool 512 will be in a tension mode rotating in an opposite direction to wind up the cable 502. Sensors will detect when a node 504 approaches the node coupling device 510. When a node 504 reaches the correct position in the node coupling device 510, the aft buffer 508 will start accumulate cable 502 at a synchronized speed with the vessel, thereby keeping a steady cable take up speed out of the water. Simultaneously, the forward buffer 506 will start moving backwards at the same speed, thereby keeping the node 504 at a steady position in the node coupling device 510 for long enough to disconnect the node 504 from the cable 502. When the node 504 is disconnected, the forward buffer 506 will move forward toward its center position, and the aft buffer 508 will move toward its lower or "open" position. As soon the aft buffer reaches the "open" position, the system 500 is ready for receiving the next node 504.

In greater detail, as shown in FIGS. 10A-10C, in order to begin the cable retrieval process, the aft pinion pulley 524 is positioned on the vertical rack 526 below the first and second aft base pulleys 520, 522 (as shown in FIG. 10A) and is no longer in contact with the cable 502. The forward pinion pulley 516 is additionally in the fully forward position on the lateral rack 518. While the forward and aft pinion pulleys 516, 524 are stationary in the forward and bottom positions on the lateral and vertical racks 518, 526, respectively, the cable 502 may be reeled in or onboarded through the system 500 at the full deployment speed V. As shown in FIG. 10A, the coupled node 504 is attached to extend from the bottom of the cable 502. In this manner, the node 504 does not interfere with either of the first and second aft base pulleys 520, 522, nor does the node 504 interfere with the aft pinion pulley 524, which is positioned at a sufficient distance beneath the path of the cable 502 for clearance of the node 504 over the top of the aft pinion pulley 524.

Once the node 504 on the cable 502 reaches the node coupling device 510, the control system causes the forward and aft pinion pulleys 516, 524 begin traveling along the lateral and vertical racks 518, 526, respectively, typically at a speed of ½V, to halt the node 504 at the node coupling device 510. Even though the cable section in front of the node coupling device 510 is stationary relative to the node coupling device 510, the cable 502 maintains an onboarding speed of V at the stern of the marine vessel and similarly a spooling speed of V as the forward and aft pinion pulleys 516, 524 move.

By effectively halting the movement of the cable 502 through the node coupling device 510, the node 504 can be easily detached from the cable 502 as indicated in FIG. 10B during the time it takes the forward and aft pinion pulleys 516, 524 to traverse lengths of the lateral and vertical racks 518, 526, respectively. Typically the time for such traversal is on the order of several seconds, e.g., if the overboarding velocity V is 5 knots (2.5 m/s). This is adequate time for the node coupling device 510 to grasp the node 504 on the cable 502, compress the spring clamp, remove the open clamp from around the cable 502, release the spring clamp on the node 504, and deposit the node 504 away from the cable 502 for storage, charging, data download, cleaning, etc.

Once a node 504 has been removed from the cable 502 the forward pinion pulley 516 begins to move forward from an aft position along the lateral rack 518 and create a buffer length of cable 502 for continuous, constant velocity take up by the spool 512. The aft pinion pulley 524 begins to simultaneously move downward from the upper position on the vertical rack 526 to relinquish its buffer length of cable 502, which is thus transferred to the forward buffer system 506. With this movement, the forward and aft pinion pulleys 516, 524 ultimately return to their starting positions for node detachment during retrieval of the cable 502 such that the next node can pass by the aft pinion pulley 524 to be positioned in the node coupling device 510, at which point the cycle repeats. During retrieval, the cable 502 winds onto the spool 512 at a constant velocity V, which is the same as the take-up velocity of the cable 502 from the water column.

Figure 11A:
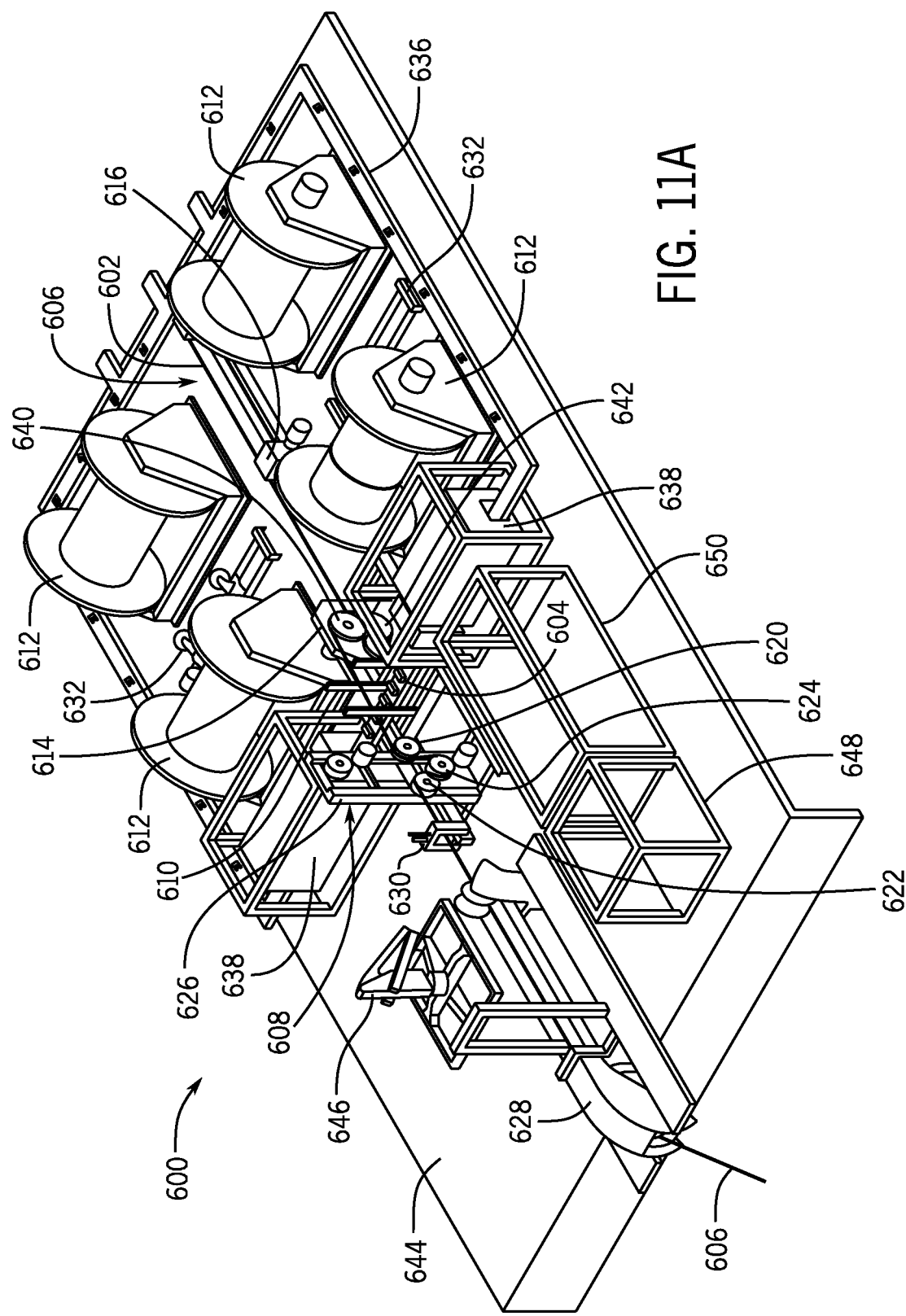
FIG. 11A is an isometric view of an embodiment of a system for seismic node deployment and retrieval that performs the functional steps of FIGS. 9A-10C.
Figure 11B:
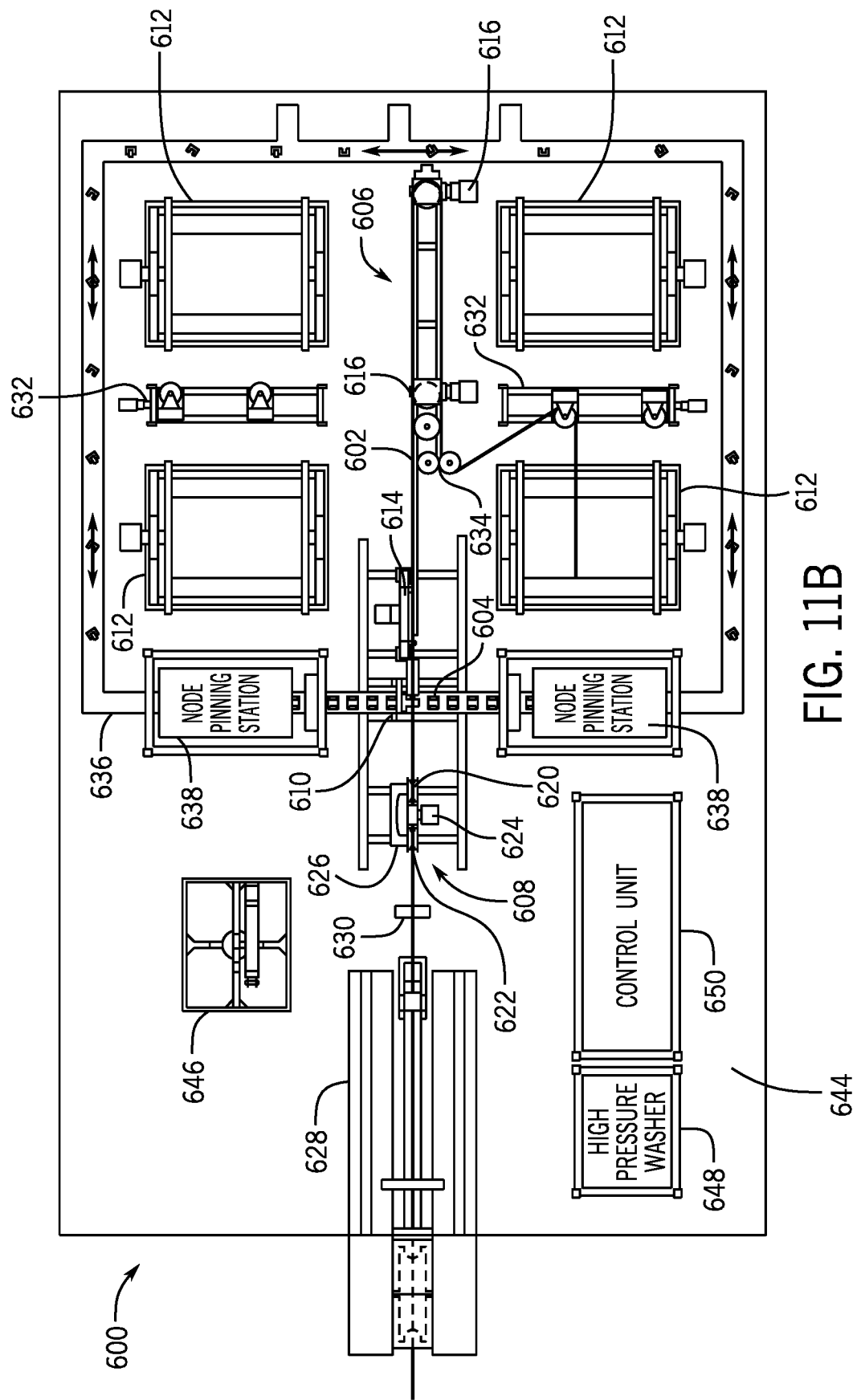
FIG. 11B is a top plan view of the system of FIG. 11A.

An exemplary implementation of a seismic node deployment system 600 according to the schematic diagrams in FIGS. 9A-10C is depicted on the back deck 644 of a marine vessel in FIGS. 11A-11B. The system 600 is configured to attach and detach a plurality of seismic receiver nodes 604 onto and from a cable 602 for deployment from and return to a marine vessel. The system 600 may include a forward buffer system 606 and an aft buffer system 608 for controlling the relative speed of the cable 602 with respect to a node coupling device 610. A number of cables 602 may be stored upon a number of spools 612 from which the cables 602 are payed out for deployment in the water column or wound around for storage when not in use. A cable tensioner 614 may be positioned between the forward buffer system 606 and the aft buffer system 608 in order to maintain appropriate tension on the cable 602 as it is payed out or hauled in. The node coupling device 610 may be positioned between the cable tensioner 614 and the aft buffer system 608.

As the cable 602 is unwound from storage on one of the spools 612, it may pass around a pulley on a spooling device 632 that aids in uncoiling and coiling the cable 602 on the spools 612. The spool 612 is typically driven by a motor and functions as a winch when both coiling and uncoiling the cable 602 from the spool 612 due to the significant mass of the cable 602 and the related moment generated while the spool 612 rotates. The pulley on the spooling device 632 travels laterally on a bar to follow the position of the cable 502 as it unwraps or wraps around the spool 612. The pulley on the spooling device 632 directs the cable 602 from between the spools 612 to the forward buffer system 606 where the cable 602 is threaded around the forward pinion pulley 616. A number of additional fixed forward guide pulleys 634 may additionally be used to direct the cable 602 along the forward buffer system 606 to the forward pinion pulley 616. In one exemplary implementation, the lateral rack 618 may include a linear array of gear teeth along its length and the motor may turn a gear that interfaces with the linear gear teeth to move the forward pinion pulley 616 back and forth on the lateral rack 618.

After winding around the forward pinion pulley 616, the cable 502 then passes through the cable tensioner 614. The cable tensioner 614 may be composed of one or more pulleys about which the cable 602 is threaded and which are configured to provide appropriate tension on the cable 602 when deploying and retrieving the cable 502 from the water column. The pulleys may include a motor-driven tension drive pulley 640 and a number of tension guide pulleys 642. The tension drive pulley 640 may have transmission gearing in order to protect the forward pinion pulley 616 and the spool 612 from excessive force that may be placed on the cable 602 by the water column.

The cable 602 next passes through the node coupling device 610, which is configured to attach a plurality of sensor nodes 604 serially onto the cable 602, typically at fixed interval spacings (and to further detach the nodes 604 from the cable 602 in an opposite operation). The nodes 604 may be conveyed to the node coupling device 610 from storage areas on the marine vessel via a conveyor system 636. In some embodiments, the nodes 604 may be designed to separate into two separate components, for example, a battery/memory component and a sensor/clock component, that are uncoupled from each other for storage and maintenance. When using such a component node configuration, the system 600 may include pinning and unpinning stations 638 adjacent to the node coupling device 610 to couple the node components together before attachment of the nodes 604 to the cable 602 or to separate the node components after the nodes 604 are removed from the cable 602. In one exemplary embodiment, the node 604 may be equipped with a spring-loaded coupler that clamps the node 504 onto the cable 502. The node coupling device 510 may be configured to pick a node 504 from a provided supply of nodes 604, compress the spring clamp, place the spring clamp around the cable 602, and release the spring clamp to connect the node to the cable 602.

After passing through the node coupling device 610, the cable 602 may be threaded through a number of pulleys forming the aft cable buffer 608. The first aft base pulley 620 and the second aft base pulley 622 may be located at fixed positions on lateral sides of the base of the vertical rack 626 along which the aft pinion pulley 624 moves. The aft pinion pulley 624 may be driven vertically along the vertical rack 626 by a motor that is under control of a control system 650. In one exemplary implementation, the vertical rack 626 may include a linear array of gear teeth along its length and the motor may turn a gear that interfaces with the linear gear teeth to move the aft pinion pulley 616 up and down on the vertical rack 626. The control system 650 may further control the forward buffer system 606, the spools 512, the cable tensioner 614, the node coupling device 610, and other components of the system 600 in order to synchronize components and balance forces and loads on the system 600.

Other components of the system 600 mounted on the back deck 644 may include an overboarding unit 628, a pressure washer unit 648, and a deck crane 646. The overboarding unit 628 may include additional guide pulleys and provide a strong, structural framework for guiding the cable 602 over the stern of the marine vessel and into the water column. The pressure washer unit 648 may be used to clean salt water, mud, and debris from the nodes 604 and other components in order to maintain and extend the life of such components. The deck crane 646 may be used to move, assemble, or disassemble any of the components of the system 600 on the back deck 644.

Figure 12:
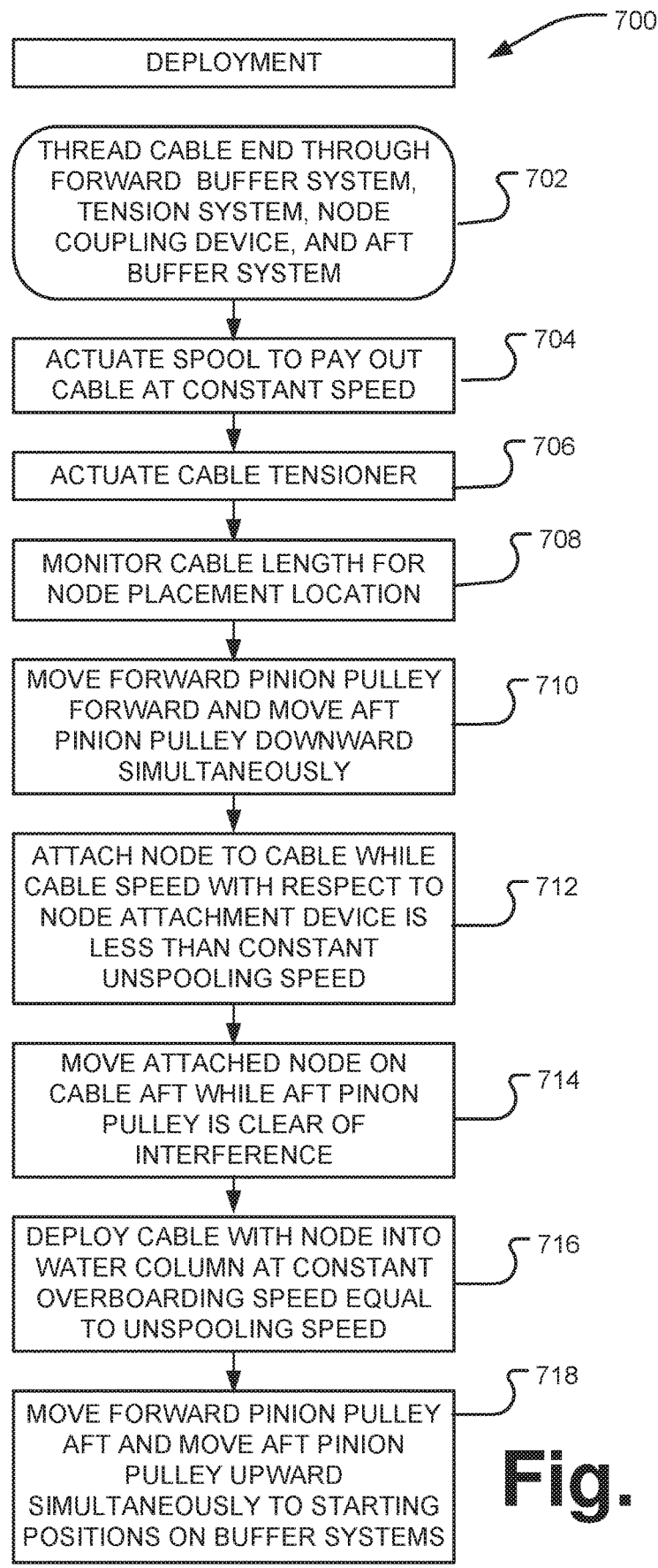
FIG. 12 is a flow diagram of operational steps performed by a control system controlling seismic node attachment and deployment according to FIGS. 9A-9D.

As indicated in the exemplary implementation depicted in FIGS. 11A and 11B, a control system is typically used to actuate and synchronize the various components of the seismic node deployment system. A flow diagram with exemplary node deployment operations 700 undertaken by a control system to coordinate such a seismic node deployment system is presented in FIG. 12. Initially, it is noted that the cable must be routed from storage on the spool through the forward buffer system, the tension system, the node coupling device, and the aft buffer system as indicated in starting configuration status 702. Once the cable is in place within the deployment system, the control system will actuate the motor on the spool to pay out the cable at a constant speed as indicated in operation 704. In conjunction, and in some instances simultaneously, the control system will actuate the motor of the driven pulley in the cable tensioner to place appropriate tension on the cable within the system as indicated in operation 706. After actuation of the spool and cable tensioner, the control system constantly monitors and adjusts the power to and effects gear changes in transmissions of the spool motor and cable tensioner motor in order to maintain proper tension on the cable and resist constantly changing forces on the cable, for example, forces of the moment of the cable mass as the spool rotates and forces from the water column dragging on cable length that is already deployed from the marine vessel.

The control system further monitors the length of cable payed out from the spool as indicated in operation 708 in order to identify the locations for node placement along the cable. Typically, the nodes will be and attached at equal separation distances along the cable. However, the control system can be programmed to attach the nodes to the cable at disparate separation distances as desired in order to meet any particular seismic recording requirements. When a node attachment location is determined to be in line with the node coupling device, the control system actuates the motors that move the forward and aft pinion pulleys on the racks. The forward pinion pulley is moved forward and the aft pinion pulley is moved downward simultaneously in operation 710 at substantially half the speed that the cable is payed out from the spool. By moving the forward and aft pinion pulleys in this manner to take up cable length on the forward end and pay out stored length on the aft end, the cable segment located at the node coupling device is substantially stationary or moves at a significantly reduced speed with respect to the node coupling device for the period that the forward and aft pinion pulleys traverse the racks.

During the period that the cable is stationary with respect to the node coupling device, the control system causes the node coupling device to attach the node to the cable as indicated in operation 712. The control system can control the time available for attachment of the nodes on the order of several seconds depending upon the length of the racks and the speed of the cable. This is adequate time for the node coupling device to pick a node from a supply, compress the spring clamp, place the open clamp around the cable, and release the spring clamp on the node to complete the attachment of the node to the cable. In some embodiments, for example, as shown in FIGS. 11A and 11B, the control system may further control and coordinate the conveyor system to deliver nodes to the node coupling device and position them for picking by the node coupling device.

The control system further monitors the position of the aft pinion pulley on the vertical rack to determine when its position is below the aft base pulleys and clear of the cable and attached node as indicated in operation 714. Once the aft pinion pulley reaches this bottom position, its movement is halted by the control system and the cable moves at a constant speed throughout the entire deployment system to pass the aft buffer system with the attached node and continue to the overboarding unit for deployment into the water column as indicated in operation 716. As noted, the speed of the cable is traveling through the deployment system is constant with respect to all components of the system at this point (i.e., the speed of the cable coming off the spool is the same as the speed of the cable with respect to the node coupling device, which is the same as the speed of the cable entering the water column).

After the node attached to the cable clears the aft buffer system, the control system actuates the motor on the forward pinion pulley to move it aft and the motor on the aft pinion pulley to move it upward as indicated in operation 718. In this manner, the forward and aft pinion pulleys return to their starting locations on the racks to prepare the deployment system to attach the next node.

Figure 13:
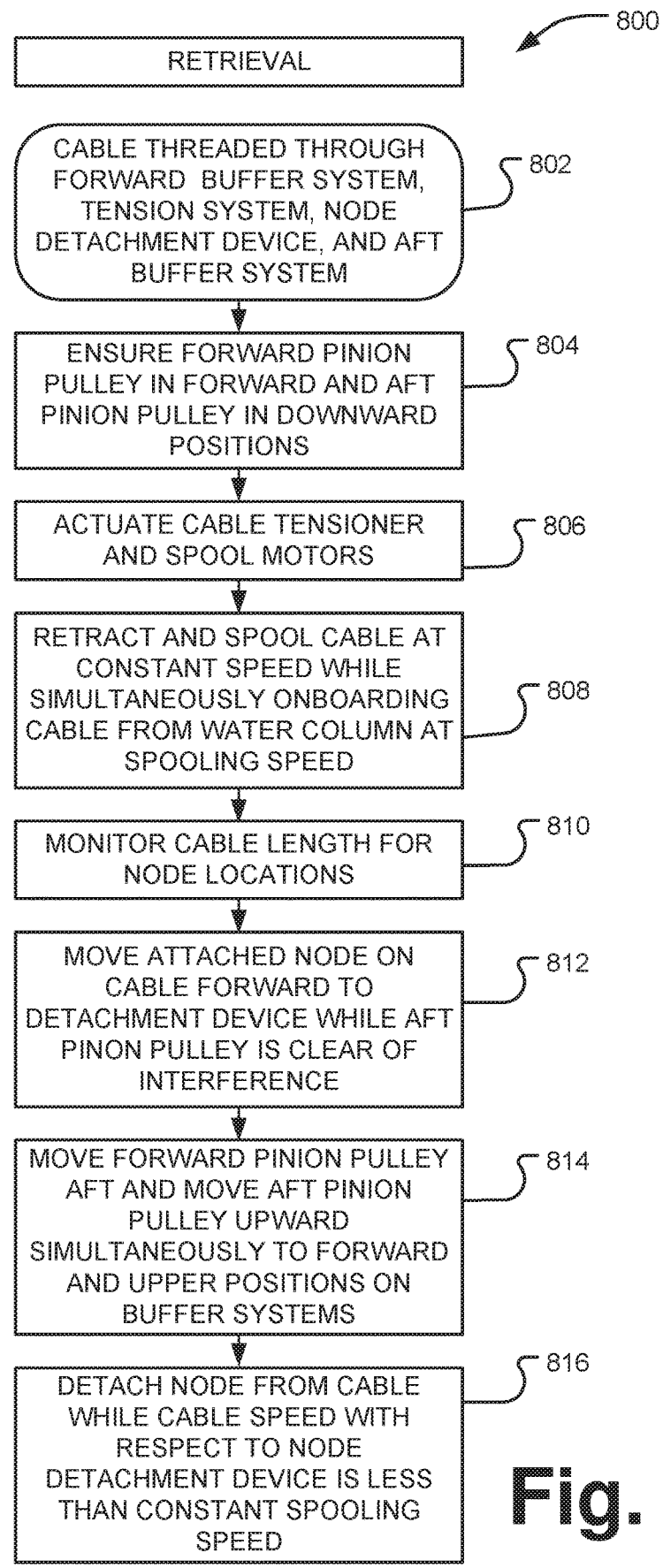
FIG. 13 is a flow diagram of operational steps performed by a control system controlling seismic node retrieval and detachment according to FIGS. 10A-10C.

FIG. 13 is a flow diagram depicting exemplary retrieval operations 800 undertaken by a control system to coordinate such retrieval of a seismic node deployment system from a water column. As with deployment, in order for the retrieval operation to begin, the cable must be attached to a spool and threaded through the forward buffer system, the tension system, the node coupling device, and the aft buffer system as indicated in starting configuration status 802.

The control system next determines whether the forward and aft pinion pulleys are in the proper starting positions for node retrieval and removal, which are the forward and downward positioned, respectively, as indicated in operation 804. If the forward and aft pinion pulleys are not is the proper positions, the control system actuates the motors that move the forward and aft pinion pulleys on the racks to the proper positions.

Once the cable is in place within the deployment system and the forward and aft pinion pulleys are in the proper starting positions, the control system will actuate the motor on the spool to coil the cable at a constant speed as indicated in operation 806. In conjunction, and in some instances simultaneously, the control system will actuate the motor of the driven pulley in the cable tensioner to place appropriate tension on the cable within the system as further indicated in operation 806. After actuation of the spool and cable tensioner, the control system constantly monitors and adjusts the power to and effects gear changes in transmissions of the spool motor and cable tensioner motor in order to maintain proper tension on the cable and resist constantly changing forces on the cable, for example, forces of the moment of the cable mass as the spool rotates and acquires more cable mass and forces from the water column dragging on changing cable length that is in the water column.

The control system further maintains a constant speed of the spool for retraction of the cable from the water column at the same constant speed as indicated in operation 808. The control system may further coordinate the rotational speed of the driven pulley in the tensioner system to draw the cable through the tensioner system at the same speed of coiling on the spool. While the cable is coiled, the control system further monitors the length of cable retrieved from the water column as indicated in operation 810 in order to identify the locations of the nodes for positioning within the node coupling device for node removal from the cable. Typically, the nodes will be and attached at equal separation distances along the cable. However, the nodes may be attached to the cable at disparate separation distances as desired in order to meet any particular seismic recording requirements. In addition to, or as an alternative to, monitoring the cable length, the control system may merely monitor for the presence and location of a node as it passes through the components of the deployment system on the back deck.

The control system specifically determines when a node has passed the aft buffer system and is in line with the node coupling device as indicated in operation 812. At this point, the forward pinion pulley is moved aft and the aft pinion pulley is moved upward simultaneously at substantially half the coiling speed of the cable onto the spool as indicated in operation 814. By moving the forward and aft pinion pulleys in this manner to take up cable length on the aft end and pay out stored length on the forward end, the cable segment with the attached node located at the node coupling device is substantially stationary or moves at a significantly reduced speed with respect to the node coupling device for the period that the forward and aft pinion pulleys traverse the racks.

By effectively halting the movement of the cable through the node coupling device, the node can be easily detached from the cable as indicated in operation 816 during the time it takes the forward and aft pinion pulleys to traverse lengths of the lateral and vertical racks, respectively. Typically the time for such traversal is on the order of several seconds. This is adequate time for the node coupling device to grasp the node on the cable, compress the spring clamp, remove the open clamp from around the cable, release the spring clamp on the node, and deposit the node for storage or maintenance activities. Once the forward and aft pinion pulleys reach their terminal aft and upward positions, respectively, the control system returns them to their starting positions to await the next node while the cable continues to be reeled in from the water column and stored on the spool at a constant speed.

EXAMPLES

Suitable system and apparatus embodiments encompass seismic node deployment systems comprising a cable supply configured to provide a cable and one or more seismic nodes configured for coupling to the cable at an attachment location for deployment to a water column. A node attachment system can be configured to drive a portion of the cable in reciprocating motion, e.g., between the cable supply and the water column, where a speed of the cable is substantially reduced adjacent the attachment location, relative to the overboarding speed at which the cable is payed out to the water column to deploy the seismic nodes.

A seismic vessel can have a plurality of such seismic node deployment systems, each disposed on the back deck in a generally parallel and longitudinal sense. A seismic array can include a plurality of seismic cables coupled to such seismic node deployment systems, and deployed to the water column thereby.

Suitable method and process embodiments include providing a cable, paying out an end of the cable to a water column, and driving a section of the cable in reciprocating motion with respect to the end that is paying out. The speed of the cable section in reciprocating motion can be reduced relative to the overboarding speed at which the cable is paying out and one or more seismic nodes can be coupled or attached to the section of cable at the reduced speed for deployment to the water column along the cable.

In any of the above examples and embodiments, the attachment speed may be reduced to substantially zero for a short period of time (e.g., from fractions of a second to several seconds depending) during each period of the reciprocating motion, where the attachment speed of the cable is defined relative to the seismic node attachment/detachment device or back deck area. In some embodiments, the attachment speed can be reduced for at least five seconds during each period of the reciprocating motion relative to the overboarding speed. Similarly, the attachment speed can be reduced for at least 25% of a period of the reciprocating motion relative to the overboarding speed or relative to the speed at which the cable is supplied. Alternatively the cable supply speed can be controlled to regulate tension in the section of the cable to which the nodes are attached.

In any of the above examples and embodiments, the reciprocating section of the cable can be engaged with at least one pulley component fixed to a reciprocating carriage, with the reciprocating motion of the cable section driven thereby. For example the cable section may make a single pass between two such pulley components fixed to the reciprocating carriage at opposing ends, or at least two passes between such pulley components fixed to a reciprocating carriage. The cable section can also be engaged with at least one stationary pulley component, e.g., a pulley attached to a back deck fixture that is stationary with respect to the reciprocating carriage.

Depending on pulley configuration, the maximum reciprocating speed of the carriage can about half or less the overboarding speed at which the cable is payed out and the seismic nodes are deployed to the water. For example, the maximum reciprocating speed may be a fraction of 1/n or less the overboarding speed at which the seismic nodes are deployed on the cable, where n is between two and eight, inclusive. Alternatively n may be larger than eight.

The reciprocating motion can be oriented substantially transverse to the cable path defined between providing the cable (e.g., at the winch or spool system) and paying out the end of the cable to the water column (e.g., at the sheave on the aft end of the back deck). Alternatively, the reciprocating motion can be oriented substantially along the cable path, similarly defined between providing the cable and paying out the end of the cable to the water column.

A plurality of seismic nodes can also be coupled to different sections of the cable while paying out to the water column, e.g., in order to deploy a seismic streamer or node line with the nodes disposed along the cable in selected locations. The nodes can also be attached to different cables, e.g., in order to deploy a multiple-cable seismic array, with the nodes disposed in selected positions along each of the cables.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

While this disclosure is made with reference to exemplary embodiments, it is will be understood by those skilled in the art that various changes may be made and equivalents can be substituted to adapt these teachings to different technical problems, materials and solutions, while remaining within the spirit and scope of the invention. The invention is thus not limited to the particular examples that are disclosed, but instead encompasses all the embodiments falling within the scope of the appended claims.

What is claimed is:
1. A seismic node deployment system comprising:
 a cable supply configured to provide a cable; for attachment of one or more seismic nodes, the one or more seismic nodes configured for coupling to the cable at an attachment location and deployment to a water column;
 a node coupling device configured to attach the one or more seismic nodes to the cable; and
 a coupling apparatus configured to drive the cable, wherein an attachment speed of the cable adjacent the coupling apparatus is reduced for attachment of the one or more seismic nodes relative to a deployment speed at which the cable is deployed to the water column, wherein the coupling apparatus comprises a cable buffer system that alternately takes up cable length from the cable and releases the cable length to the cable, reducing the attachment speed of the cable adjacent the coupling apparatus relative to the deployment speed.

2. The seismic node deployment system of claim 1, wherein the cable buffer system comprises:
a forward cable buffer that alternately takes up and releases cable length forward of the attachment of the one or more seismic nodes; and
an aft cable buffer that alternately takes up and releases cable length aft of the attachment of the one or more seismic nodes,
wherein the aft cable buffer takes up and releases cable in conjunction with and in opposition to the take up and release of cable performed by the forward cable buffer.

3. The seismic node deployment system of claim 1, wherein the coupling apparatus is configured to drive a portion of the cable in a reciprocating motion, such that the attachment speed of the cable adjacent the coupling apparatus is periodically increased and decreased relative to the deployment speed at which the cable is deployed to the water column.

4. The seismic node deployment system of claim 3, wherein the coupling apparatus is configured to drive the portion of the cable in the reciprocating motion longitudinally along a path of the cable defined between the cable supply and the water column, transverse to the path of the cable, or both.

5. The seismic node deployment system of claim 1, wherein one or both of: the deployment speed is substantially constant; and
the cable supply provides the cable at a delivery speed substantially the same as the deployment speed.

6. The seismic node deployment system of claim 1, wherein the coupling apparatus comprises a plurality of pulley components and a reciprocating carriage, and wherein the cable is coupled to the reciprocating carriage by engagement with the plurality of pulley components.

7. The seismic node deployment system of claim 6, further comprising a mechanical drive configured to drive the plurality of pulley components such that a portion of the cable is periodically approximately stationary adjacent the coupling apparatus for attachment of the one or more seismic nodes.

8. The seismic node deployment system of claim 1, wherein the coupling apparatus comprises a plurality of pulley components and the cable makes a pass between the pulley components.

9. The seismic node deployment system of claim 1, further comprising a traction winch or cable tensioner configured to control or maintain a speed or tension at which the cable is provided by the cable supply or deployed to or recovered from the water column.

10. A seismic node deployment system comprising: a cable supply configured to provide a cable;
one or more seismic nodes configured for coupling to the cable at an attachment location for deployment to a water column;
a node coupling device configured to attach the seismic nodes to the cable; and
a node attachment system configured to drive a first portion of the cable in periodic motion between the cable supply and the node coupling device and to drive a second portion of the cable in a periodic motion between the node coupling device and the water column,
wherein a speed of the cable is substantially reduced adjacent the attachment location relative to a speed of the cable as the cable is deployed to the water column.

11. The seismic node deployment system of claim 10, wherein the cable is deployed to the water column or retrieved from the water column at a substantially constant speed.

12. The seismic node deployment system of claim 10, wherein the node attachment system comprises a cable buffer system that alternately takes up cable length from the cable and releases the cable length to attach the seismic nodes.

13. The seismic node deployment system of claim 12, wherein the cable buffer system comprises:
a forward cable buffer that alternately takes up and releases cable length forward of the attachment location; and
an aft cable buffer that alternately takes up and releases cable length aft of the attachment location, in conjunction with and in opposition to the take up and release performed by the forward cable buffer, such that the periodic motion is reciprocating.

14. The seismic node deployment system of claim 12, wherein the cable buffer system comprises a pulley around which the cable passes and a motor that drives the pulley back and forth to take up and release the cable length.

15. The seismic node deployment system of claim 14, wherein the cable buffer system further comprises a first stationary pulley around which the cable passes and a second stationary pulley spaced apart from the first stationary pulley and around which the cable passes, wherein the pulley travels transversely between the first and second stationary pulleys.

16. The seismic node deployment system of claim 10, wherein the cable supply comprises a motor-driven spool and further comprising a control system that coordinates a reciprocating motion of the first portion of the cable with a reciprocating motion of the second portion of the cable.

17. A seismic node deployment system comprising:
a cable supply configured to provide a cable for attachment of one or more seismic nodes, the one or more seismic nodes configured for coupling to the cable at an attachment location and deployment to a water column;
a node coupling device configured to attach the one or more seismic nodes to the cable; and
a coupling apparatus configured to drive the cable, wherein an attachment speed of the cable adjacent the coupling apparatus is reduced for attachment of the one or more seismic nodes relative to a deployment speed at which the cable is deployed to the water column,
wherein the coupling apparatus comprises an aft cable buffer that alternately takes up and releases cable length aft of the attachment of the one or more seismic nodes.

18. The seismic node deployment system of claim 17, wherein the coupling apparatus comprises:
a forward cable buffer that alternately takes up and releases cable length forward of the attachment of the one or more seismic nodes,
wherein the aft cable buffer takes up and releases cable in conjunction with and in opposition to the take up and release of cable performed by the forward cable buffer.

19. The seismic node deployment system of claim 17, wherein the coupling apparatus is configured to drive a portion of the cable in a reciprocating motion, such that the attachment speed of the cable adjacent the coupling apparatus is periodically increased and decreased relative to the deployment speed at which the cable is deployed to the water column.

20. The seismic node deployment system of claim 19, wherein the coupling apparatus is configured to drive the portion of the cable in the reciprocating motion longitudinally along a path of the cable defined between the cable supply and the water column, transverse to the path of the cable, or both.

21. The seismic node deployment system of claim 17, wherein one or both of: the deployment speed is substantially constant; and the cable supply provides the cable at a delivery speed substantially the same as the deployment speed.

22. The seismic node deployment system of claim 17, wherein the coupling apparatus comprises a plurality of pulley components and a reciprocating carriage, and wherein the cable is coupled to the reciprocating carriage by engagement with the plurality of pulley components.

23. The seismic node deployment system of claim 22, further comprising a mechanical drive configured to drive the plurality of pulley components such that a portion of the cable is periodically approximately stationary adjacent the coupling apparatus for attachment of the one or more seismic nodes.

24. The seismic node deployment system of claim 17, wherein the coupling apparatus comprises a plurality of pulley components and the cable makes a pass between the pulley components.

25. The seismic node deployment system of claim 17, further comprising a traction winch or cable tensioner configured to control or maintain a speed or tension at which the cable is provided by the cable supply or deployed to or recovered from the water column.

\* \* \* \* \*